United States Patent [19]

Abe et al.

[11] 4,375,373

[45] Mar. 1, 1983

[54] METHOD OF COATING INORGANIC PIGMENTS (ULTRAMARINE AND BRONZE POWDER) WITH DENSE AMORPHOUS SILICA

[75] Inventors: Nobuyoshi Abe; Kiyoshi Kanemaru, both of Urawa; Minoru Yokoyama, Tokyo, all of Japan

[73] Assignees: Toro Ganryo Kogyo Co., Ltd.; Nippon Chemical Industrial Co., Ltd., both of Tokyo, Japan

[21] Appl. No.: 326,255

[22] Filed: Dec. 1, 1981

Related U.S. Application Data

[63] Continuation of Ser. No. 108,609, Dec. 31, 1979.

[30] Foreign Application Priority Data

Dec. 29, 1978 [JP] Japan ............................... 53-162203
Dec. 29, 1978 [JP] Japan ............................... 53-162204
Feb. 26, 1979 [JP] Japan ............................... 54-20876
Feb. 26, 1979 [JP] Japan ............................... 54-20877
Apr. 10, 1979 [JP] Japan ............................... 54-42563
Apr. 10, 1979 [JP] Japan ............................... 54-42564
Apr. 17, 1979 [JP] Japan ............................... 54-46085
Apr. 17, 1979 [JP] Japan ............................... 54-46086

[51] Int. Cl.$^3$ .................. C09C 1/32; C09C 1/66; C09C 1/00

[52] U.S. Cl. .................. 106/308 B; 106/288 B; 106/290; 106/294; 106/297; 106/298; 106/300; 106/301; 106/302; 106/303; 106/304; 106/305; 106/306; 106/309

[58] Field of Search ............... 106/308 B, 288 B, 290, 106/305, 308 F; 423/338; 252/313 S

[56] References Cited

U.S. PATENT DOCUMENTS

| | | | |
|---|---|---|---|
| 2,296,638 | 9/1942 | Hanahan | 106/305 X |
| 2,731,326 | 1/1956 | Alexander et al. | 423/338 |
| 2,913,419 | 11/1959 | Alexander | 252/313 S |
| 3,276,893 | 10/1966 | Quaas et al. | 106/290 |
| 3,383,231 | 5/1968 | Allan | 106/308 B |
| 3,454,513 | 7/1969 | Azarian | 106/290 X |
| 3,639,133 | 2/1972 | Linton | 106/308 B |
| 3,864,137 | 2/1975 | van Bonin et al. | 106/84 |
| 3,954,496 | 5/1976 | Batzar | 106/308 B |
| 4,082,905 | 4/1978 | Stephan et al. | 106/308 B |
| 4,132,560 | 1/1979 | Marquisee et al. | 106/308 B |
| 4,309,459 | 1/1982 | Tokuoka | 423/633 X |
| 4,334,933 | 6/1982 | Abe et al. | 106/305 |

FOREIGN PATENT DOCUMENTS

46-9555 3/1971 Japan.
49-8019 3/1974 Japan.

OTHER PUBLICATIONS

Iler, R. K.-*The Colloid Chemistry of Silica and Silicates*--Pub. by Cornell Univ., N.Y. (1955), pp. 91-92.

*Primary Examiner*—Helen M. McCarthy
*Attorney, Agent, or Firm*—Sughrue, Mion, Zinn, Macpeak and Seas

[57] ABSTRACT

A stable inorganic pigment having the surface thereof a continuous coating of fine amorphous silica.

6 Claims, No Drawings

METHOD OF COATING INORGANIC PIGMENTS (ULTRAMARINE AND BRONZE POWDER) WITH DENSE AMORPHOUS SILICA

This is a continuation of application Ser. No. 108,609, filed Dec. 31, 1979.

BACKGROUND OF THE INVENTION

1. Field of the Invention

This invention relates to a process for preparing stable ultramarine, metal powder and other inorganic pigment compositions the particles of which are coated with fine amorphous silica and which has good pigment characteristics, i.e., high chemical resistance, hydrogen sulfide resistance, light resistance, weatherability, heat resistance and storage stability.

2. Description of the Prior Art

Pigments are widely used as colorants for paints, printing ink and various articles such as plastics, rubber, construction materials, cosmetics and paper. They are also used as an agent for providing protective coatings because of their advantageous physical and chemical properties such as hiding power, covering power, reflecting properties, insulating effect and rust preventing power. Ultramarine (Color Index No. 77007) is a pigment with a blue to purplish pink hue and it consists mainly of silicate, alumina and sodium oxide plus sulfur. Because of its very low toxicity to man and animals, the pigment has recently gained increasing attention for use as a colorant not only for construction materials but also for use in synthetic resin paints, printing inks, rubbers, artists' paints, cloths, paper, synthetic detergents, textiles and cosmetics. Metal powder pigments in a flake form and having characteristic metallic colors are primarily used for ornamental coatings or corrosion inhibition of molded plastics, printing inks, paints, cosmetics, wall papers, fans, toys, pictures. However, these pigments have undesired properties of their own, for example, there is the chalking of titanium oxide, the heat- or light-induced discoloration of chrome yellow and yellow oxide and the decomposition of inorganic pigments (e.g., cadmium ultramarine pigments) with acid. Further, metal powder pigments discolor upon exposure to heat, light and hydrogen sulfide and decompose when contacted with acid. For these reasons, the type and amount of pigments used are essentially limited by the manufacturing process and the use of the articles to which they are applied. Conversely, the type of pigments limits the articles to which they can be applied. For example, chlorine gas generated during the manufacture of a sheet of polyvinyl chloride containing ultramarine decomposes the pigment and results in discoloration of the sheet and the generation of hydrogen sulfide. Immersing the ultramarine powder in hydrochloric acid causes rapid decomposition of the pigment accompanied by the generation of hydrogen sulfide.

With the recent improvement in the technology of forming and processing olefinic plastics as well as the use of manufacturing temperatures higher than 250° C., the demand for highly heat-resistant metal powder pigments has increased. Under these circumstances, various industrial sectors have expressed a strong need for an improvement in pigment characteristics such as light resistance, weather-ability, chemical resistance, hydrogen sulfide resistance, heat resistance, and storage stability. Many processes for improving the characteristics of pigments have been proposed and implemented on a commercial scale, but the fact is they have their own advantages and disadvantages. Examples of the methods for improving metal powder pigments are: (1) heat treatment with boric acid and borax or covering the pigment with organic matter as described in Japanese Pat. Nos. 482178, 496788 and 570291, (2) covering the pigment with a transparent metal oxide film containing beryllium and chromium as described in Japanese Pat. No. 509549, and (3) a surface treatment with chromate as described in Japanese Patents 509812 and 924417. However, none of these techniques provide pigments adequately resistant to heat, corrosion and chemicals. Other known improvements use an aqueous solution of an alkali silicate. One of them comprises adding first an aqueous solution of silicate and then boric acid and an aliphatic alcohol during the grinding of the metal powder as described in Japanese Patent Publication No. 40696/72. The method adds a very thick alkali silicate in the course of grinding a pigment and then forms a silica gel, but the gel formed is heterogeneous and coarse and may contain unreacted alkali silicate. As a result, the silica gel coating comes off the pigment easily and has little covering power. Other techniques combine a chromate treatment simultaneously with the coating of a silica as described in Japanese Patent Publication No. 8019/74; and reacting an aqueous solution of silicate with an aqueous solution of an acidic aluminum salt by adding the former to the latter or vice versa to form the silica precipitate, followed by heating to a temperature higher than 200° C. as described in Japanese Patent Publication No. 46775/76. The silica formed in these methods has only weak power to cover the metal powder pigment. This may be the reason the two methods require a chromate treatment and a heat treatment, respectively, to provide a pigment with the desired resistance. The silica formed in these methods is a precipitated silica gel which consists of large particles, is heterogeneous, easily becomes porous, and is therefore difficult to deposit on the pigment particles. A continuous coating of silica is not formed, and the coating easily separates from the pigment particles. As a result, none of the methods described above is completely satisfactory. They do not adequately improve the various resistances required of metal powder pigments.

A method is disclosed in Japanese Patent Publication No. 16531/74 for improving the resistance of inorganic pigments by covering the pigment particles with a metal oxide by means of a hydrothermal treatment with heat and pressure, but the method does not fully achieve the properties desired probably because the particles of the metal oxide grow in size during the hydrothermal treatment. A method described in Japanese Patent Publication No. 9555/71 (corresponding to U.S. Pat. application Nos. 493,295 and 555,954) covers particles of a lead chromate pigment with a fine amorphous silica produced from the reaction of a dilute aqueous solution of sodium silicate and dilute sulfuric acid. The resulting silica coat makes the pigment very resistant in many aspects, but because of the strong acidity of sulfuric acid, the method is not applicable to ultramarine which is sensitive to the acid (the crystal structure of the pigment would be attacked resulting in destruction of the pigment per se). An attempt to preserve the crystal structure of ultramarine from the acid attack by using a very dilute aqueous sulfuric acid is practically impossible because it requires the preparation of a huge volume of sulfuric acid solution which is not economical in commercial operations.

As a result of various studies on a method of coating particles of any inorganic pigment with a protective coat which is free from the defects described above, it has been found that certain compounds, which will not damage the particles of pigment, react with an aqueous solution of alkali silicate and form an extremely fine and reactive silica. The pigment which is coated with such silica is remarkably resistant.

SUMMARY OF THE INVENTION

Accordingly, a principal object of the present invention is to provide ultramarine and metal powder pigments which are heat resistant, chemical resistant, light resistant, etc.

Another object of the present invention is to provide ultramarine and metal pigments which are coated with a continuous layer of fine amorphous silica which renders the pigments non-porous.

A further object of the present invention is to provide a process for preparing resistant inorganic pigments including ultramarine and metal powder pigments wherein a silica sol prepared by reacting an alkali silicate with various compounds capable of reacting with the silicate to provide a colloidal silica having a large number of silanol groups and a small number of siloxane bonds of low polymerization degree, under specific conditions, which readily deposits on the pigments to form a continuous layer having a strong affinity for the particles.

DETAILED DESCRIPTION OF THE INVENTION

The inorganic pigment (including ultramarine and metal powder pigments) of this invention comprises particles covered with a continuous layer of fine amorphous silica formed by depositing particles of active silica sol on the surfaces of the pigment, followed by dehydration. Such amorphous silica comprises very fine particles of an active silica sol obtained by decomposing an aqueous solution of alkali silicate with selected water soluble or aqueous alkali soluble compounds under specific conditions as described herein. Theoretically, sodium silicate is decomposed with an acid to form silicic acid. When the silanol group of the acid is subjected to dehydration polymerization, a siloxane group is formed and polymerization occurs at an accelerated rate. The active silica sol defined in this invention is a colloidal silica having a large number of silanol groups and a small number of siloxane bonds of low polymerization degree and is obtained by decomposing alkali silicate under specific conditions. The resulting active silica sol has a strong tendency to deposit on the particles of an inorganic pigment and the deposit has strong affinity for the pigment particles. Silica of high polymerization degree containing many siloxane bonds is not suitable for the purposes of this invention because it is inactive, has weak affinity for the pigment particles, and is often porous. According to this invention, the active silica sol is formed without any adverse effect on the particles of an inorganic pigment, even on particles of ultramarine or metal powder pigment. The active silica sol is uniformly deposited on each particle of the inorganic pigment, then dehydrated to form a continuous and dense film of amorphous silica that covers the pigment particle.

A typical advantage of the silica film obtained in this invention is that particles of ultramarine coated with the film are not decomposed even if they are contacted with concentrated hydrochloric acid as will be demonstrated hereunder in the examples. Observation under an electron microscope (ca. 100,000 x) shows microencapsulated ultramarine particles completely covered with a dense and continuous film of fine silica. The amount of silica with which the pigment of this invention is covered can be adjusted depending upon the use of the composition but is at least about 1 wt % of the total weight of the composition in terms of $SiO_2$ and, in most cases, less than about 40 wt % silica will serve the purpose.

Any type of metal powder pigment may be used in this invention if it is stable in an aqueous alkaline solution. Illustrative metal powder pigments are elemental metals such as pure silver, tin, zinc and copper as well as alloys such as a copper-zinc alloy. In most cases, a copper-zinc alloy is particularly preferred as a golden yellow pigment.

The process of this invention is also applicable to other inorganic pigment. Illustrative pigments include: chromate pigments such as chrome yellow, chrome vermilion and barium chromate; iron oxide pigments such as yellow oxide, red oxide and iron black; titanium oxide pigments such as titanium oxide and titanium yellow; lead oxide pigments such as red lead oxide, white lead and litharge; calcium salt pigments such as calcium carbonate; barium salt pigments such as barium carbonate and barium sulfate; magnesium salt pigments such as magnesium carbonate; cobalt pigments such as cobalt violet, cobalt blue and cobalt gree; manganese pigments such as manganese violet and manganese blue; cadmium pigments such as cadmium yellow and cadmium red; vermilion, antimony trioxide, lead sulfate, zinc oxide, aluminum oxide, lithopone, viridian and chromium oxide green. Calcined pigment and silicate inorganic powder pigments such as talc, kaolin, aluminum silicate, magnesium silicate, and calcium silicate may also be employed.

Metal powder pigments are often subjected to a preliminary surface treatment with chromate or boric acid. These surface treatments are known and described in Japanese Patent Nos. 482178, 570291, 509812, 924477, etc., and incorporated in the manufacture of some commercial metal powder pigments. Treatment with boric acid comprises either forming a uniform mixture of boric acid and anhydrous borax with a metal powder which is heated directly to a temperature higher than 200° C., or heating a metal pigment immersed in a solution of a boron compound dissolved in a solvent composed of water and a degreasing agent (see Japanese Patent Publication No. 6568/66). The chromate treatment comprises treating the surface of the particles of metal pigment immersed in a mixture of a hexavalent chromium compound and water, and optionally a degreasing agent. Examples of the hexavalent chromium compounds include chromic anhydride, sodium dichromate, potassium dichromate and ammonium dichromate. Chromic anhydride is generally preferred. The hexavalent chromium compound is preferably used in combination with boron compounds such as boric acid, borax, boric anhydride and boric esters; or inorganic or organic phosphorus compounds such as phosphoric acid, pyrophosphoric acid, phosphoric ester and acidic phosphoric ester.

The purpose of the degreasing agent in the above treatments is to render the metal pigment hydrophilic. The pigment is generally hydrophobic due to the higher aliphatic acid employed in the manufacture of the pigment. Any organic solvent may be used as a degreasing agent without particular limitation so long as it renders the particles of a metal pigment hydrophilic and has some degree of miscibility with water. Examples of the suitable organic solvents are various alcohols and dioxane. Degreasing can also be achieved using an aqueous alkaline solution or a suitable surfactant used in the preparation of a slurry of a metal powder as will be described hereunder. In such a case, the degreasing step precedes the surface treatment described above. However, it is generally preferred from the viewpoint of operation efficiency to perform degreasing and surface treatment at the same time by using a degreasing agent. If degreasing is effected simultaneously with chromate treatment, the treating bath may be an aqueous solution containing about 0.2 to 3 wt % of a hexavalent chromium compound in terms of $CrO_3$, about 0 to 0.4 wt % of phosphoric acid in terms of $P_2O_5$, about 0 to 5 wt % of a boron compound in terms of $B_2O_5$, plus a suitable degreasing agent.

A metal pigment is immersed in a treating bath for a period of not more than about 1 hour at either ordinary temperatures or elevated temperatures. The surface treatment procedure outlined above is conventional and can be applied to the process of this invention. It combines with the subsequent step of covering the surface-treated metal powder pigment particles with silica to provide very much improved corrosion resistance and heat stability. Commercial metal powder pigments which have already been subjected to the desired surface treatment may be used in this invention with advantage.

Prior to covering with fine silica, the inorganic pigments other than ultramarine and metal powder pigments may be covered with a hydrous metal oxide such as hydrous oxides of zirconium, aluminum, titanium, cerium, antimony and magnesium. An aqueous slurry of the proper concentration is mixed with one or more fine hydrous oxides of zirconium, aluminum, titanium, cerium, antimony and magnesium so that the pigment particles are covered with the deposit of the hydrous oxides. To achieve this purpose, an aqueous solution of at least one salt selected from the group consisting of a zirconium salt, an aluminum salt, a titanium salt, a cerium salt, an antimony salt and a magnesium salt is added to the slurry. Examples of the zirconium salt are zirconium sulfate, zirconium chloride, zirconium nitrate, and basic salts of zirconium; examples of the aluminum salt are aluminum sulfate, aluminum chloride, aluminum nitrate, aluminum phosphate and basic salts of aluminum, such as sodium aluminate; examples of the titanium salt are titanium chloride and titanium sulfate; examples of the cerium salt are cerium chloride, cerium sulfate and cerium nitrate; an example of the antimony salt is antimony chloride; and examples of the magnesium salt are magnesium sulfate, magnesium chloride and magnesium nitrate. The concentration of the aqueous solution of these salts is preferably as low as possible, and in most cases, it is preferably less than 10 wt %, more preferably less than 5 wt %, in terms of the corresponding oxide. The aqueous solution of these salts is gradually added to the slurry while it is stirred at room temperature (20°-30°) or with heating. The slurry may have any level of pH so long as it enables the aqueous salt to be hydrolyzed in the slurry. Therefore, a suitable amount of acidifying or alkalifying agent may be contained in the slurry, and ordinarily, hydrolysis is performed under acidic conditions until a fine hydrous oxide is deposited on the pigment particles. The maximum amount of the aqueous solution of metal salt added is 5 wt %, in terms of the corresponding oxide, of the total weight of the pigment and solution.

After deposition of the hydrous metal oxide, the pigment particles are redispersed in water or warm water either directly or after separation from the mother liquor, and the pH and temperature of the slurry are adjusted in the manner described below, and the thus prepared slurry is ready for the subsequent step of covering with silica sol. Alternatively, the cake obtained by filtering the mother liquor is dehydrated, redispersed in water or warm water, and the pH and temperature are adjusted likewise to prepare an aqueous slurry suitable for the subsequent treatment.

The stable pigment of this invention is prepared in the following manner.

The pigments must, either directly or after the preliminary treatments described above, be formulated as a uniform slurry before the particles are subjected to the subsequent covering with fine, amorphous silica. The pigments can be adequately dispersed in an aqueous medium to form a slurry of the desired concentration, but the pigments are preferably dispersed under an alkaline condition. A surfactant having a wetting effect may be used in dispersing a metal powder since the surfaces of metal powder pigments are usually coated with various oily coatings in the course of production or application of the pigment. Suitable alkaline agents include caustic alkali, alkali carbonate, alkali silicate, alkali phosphate and ammonia as well as basic organic matter such as ethanolamine. These agents are mentioned here for illustrative purposes only and they may even be omitted from the treatment of certain pigment. Less than 2 mol/l of the alkali is generally sufficient to achieve uniform dispersion of pigment particles. Mechanical shearing and ultrasonic waves may advantageously be used to redisperse secondary particles of pigment. The pigments are preferably dispersed using a hydrothermal treatment under an alkaline condition in which the slurry of pigment is generally heated at about 60° to 250° C. under atmospheric or superatmospheric pressure for a period of at least about 30 minutes, preferably from 1 to 5 hours.

A low slurry concentration requires a drain system and large scale reactor, whereas a high slurry concentration either prevents uniform dispersion of pigment particles or uniform deposition of silica sol in the subsequent step. Therefore, the slurry concentration should be determined at a practical level which is in most cases about 50 to 300 g/l. The thus prepared slurry of pigment particles may be immediately subjected to the subsequent step of silica sol deposition during which the slurry is held at a pH between about 7 and 11, preferably between about 8 and 11 in the case of metal powder pigments and 9 to 11 in the case of other inorganic pigments, and at a temperature of at least about 60° C., preferably about 70° to 100° C.

The thus prepared pigment slurry is mixed with specific components to form a fine silica sol which uniformly covers the pigment particles. The formation of the silica sol is achieved by adding an aqueous solution of alkali silicate and one or more compounds to be described hereunder while the pH and temperature of the slurry are controlled within the specified range.

Any type of the alkali silicate may be used as an aqueous solution. Generally, it is such that the molar ratio of $SiO_2$ to $M_2O$ (where m is Na or K) is between 2 to 4, and sodium silicate having a molar ratio of from 3 to 3.5 is advantageously used. For effective production of the silica sol, the concentration of the aqueous solution of alkali silicate should be as low as possible but it should not be so low as to decrease the operating efficiency and drainage efficiency; in most cases, a practical concentration is about 1 to 10 wt % as $SiO_2$.

The compound used for the production of the silica sol in this invention is a water soluble organic or inorganic compound which is capable of reacting with an aqueous solution of alkali silicate to form fine particles of silica sol without attacking the pigment crystal or the surfaces of the pigment particles. It contains a hydrogen ion active enough to convert, e.g., sodium silicate to silicic acid and condense the silanol group to form a siloxane bond such that the desired particles of silica sol result. Suitable organic or inorganic compounds are water soluble at temperatures lower than 100° C. under industrially advantageous conditions, and specifically, they have a solubility of at least about 0.01 g/100 g $H_2O$ and a pH value of at least 1.0 as a 3 wt % aqueous solution at room temperature (20° C.).

The organic compounds which are suitable silica sol forming agents are typified by "organic acids" as defined in *Encyclopaedia Chimica*, Vol. 9, p. 339, Kyoritsu Publishing Company. According to this invention, the organic compounds also include organic acids substituted with a halogen atom, a hydroxyl group, a cyano group, an amino group, a nitro group, a lower alkyl group, an allyl group, an alkoxy group and a phenyl group, as well as their derivatives such as salts, esters, amides, aldehydes, anhydrides and peroxides.

Illustrative organic compounds will hereunder be provided, but it will be understood from the foregoing that they are by no means intended to limit the invention.

Carboxylic acids including saturated aliphatic monovalent caboxylic acids preferably having 1 to 10 carbon atoms such as formic acid, acetic acid, propionic acid, butyric acid, valeric acid and caproic acid. These acids may be substituted, for example, by a halogen atom, a cyano group, an alkyl group containing 1 to 4 carbon atoms, a phenyl group, etc. Acids such as mono-, di- and trifluoroacetic acids, mono-, di- and trichloroacetic acids, mono-, di- and tribromoacetic acids, sulfoacetic acid, cyanoacetic acid, di-and trimethylacetic acids, acetoacetic acid, mono- and diphenylacetic acids, mono- and difluoropropionic acids, mono- and dichloropropionic acids, mono- and dibromopropionic acids, pheylpropionic acid and methylbutyric acid can be used.

Aliphatic unsaturated carboxylic acids preferably having 3 to 18 carbon atoms and which in some cases may contain a halogen atom or an amino group such as acrylic acid, methacrylic acid, crotonic acid, maleic acid, fumaric acid, vinylacetic acid, and cinnamic acid; aliphatic saturated divalent carboxylic acids such as oxalic acid, mesoxalic acid, malonic acid, succinic acid, glutaric acid, adipic acid, pymelic acid, suberic acid, azelaic acid, sebacic acid, and their substitution products such as oxamic acid, and cholorosuccinic acid can be used.

Oxycarboxylic acids preferably having 2 to 14 carbon atoms and 1 to 4 hydroxy groups such as glyceric acid, glycollic acid, lactic acid, β-oxypropionic acid, (β-, γ-)oxybutyric acid, oxymalonic acid, malic acid, citric acid, tartaric acid, mandelic acid, and aldehydeacid and keto-acid such as glyoxalic acid, pyruvic acid, oxalacetic acid and levulinic acid can be used.

Aromatic carboxylic acid which may be mono- or di-nuclear and which in some cases may be substituted by a halogen atom, a hydroxyl group, an amino group, a nitro group, an alkyl group or an alkoxy group having 1 to 4 carbon atoms, such as benzoic acid, (o-, m-, p-)chlorobenzoic acid, dichlorobenzoic acid, (o-, m-, p-)nitrobenzoic acid, dinitrobenzoic acid, (o-, m-, p-)toluylbenzoic acid, ditoluylbenzoic acid, (o-, m-, p-)oxybenzoic acid, (o-, m-, p-)aminobenzoic acid, aminosalicylic acid, sulfosalicylic acid, protocatechuic acid, aspirin, anisic acid, benzilic acid, vanillic acid, sulfobenzoic acid, sulfinic acid, gallic acid, and hippuric acid; aromatic polyvalent carboxylic acids such as phthalic acid, isophthalic acid, terephthalic acid, hemimellitic acid, trimellitic acid, trimesic acid, prehnitic acid, mellophanic acid, pyromellitic acid, benzenepentacarboxylic acid, and mellitic acid can be used.

Phenols which in some cases may be substituted by a halogen atom, a hydroxyl group, an amino group, a nitro group or an alkyl group having 1 to 4 carbon atoms such as phenol, (o-, m-, p-)cresol, (o-, m-, p-)chlorophenol, dichlorophenol, trichlorophenol, (o-, m-, p-) nitrophenol, dinitrophenol, (o-, m-, p-)bromophenol, dibromophenol, picric acid, (o-, m-,p-)aminophenol, catechol, resorcin, hydroquinone, pyrogallol, oxyhydroquinone, and phloroglucinol can be used.

Sulfonic acids including alkylsulfonic and arylsulfonic acids such as methylsulfonic acid, ethylsulfonic acid, sulfamic acid, methyl sulfate, dimethyl sulfoxide, benzenesulfonic acid, (o-, m-, p-)phenolsulfonic acid, naphthalenesulfonic acid, and sulfanilic acid can be used.

Amino acids which preferably contain 2 to 15 carbon atoms such as glycine, dimethylglycine, alanine, cerin, valine, leucine, isoleucine, pheynylalanine, threonine, proline, cysteine, methionine, glutamic acid, aspartic acid, ornithine, lysine, and arginine can be used.

Organic acids having a heterocyclic ring in particular a 5- or 6-membered unsaturated heterocyclic ring containing an oxygen, sulfur or nitrogen atom such as furancarboxylic acid, furandicarboxylic acid, thiophenecarboxylic acid, thiophenedicarboxylic acid, pyrrolecarboxylic acid, pyrroledicarboxylic acid, pyridinemonocarboxylic acid, pyridinedicarboxylic acid, pyridinetricarboxylic acid, pyridinetetracarboxylic acid, pyridinepentacarboxylic acid, pyridinemonoacetic acid, and pyridinediacetic acid can be used.

The salts of these compounds are preferably carboxylic acid salts of Na, K, Mg, Ba, Zn, Al, Ni, Fe, Cu, Ti and ammonium such as zinc formate, potassium hydrogenformate, ammonium formate, zinc acetate, aluminum acetate, iron acetate, nickel acetate, barium acetate, ammonium acetate, zinc valerate, magnesium valerate, ammonium valerate, zinc maleate, sodium hydrogenmaleate, barium maleate, copper maleate, diammonium maleate, zinc oxalate, sodium hydrogenoxalate potassium hydrogenoxalate, aluminum oxalate, potassium antimony oxalate, titanium oxalate, copper oxalate, nickel oxalate, zinc sebacate, barium sebacate, magnesium sebacate, ammonium sebacate, sodium hydrogencitrate, potassium hydrogencitrate, aluminum citrate, iron citrate, nickel citrate, ammonium citrate, copper glycolate, ammonium mandelate, zinc benzoate, aluminum benzoate, ammonium benzoate, ammonium carbamate and potassium hydrogenphthalate.

Examples of the esters are esters of aliphatic alcohols having 1 to 4 carbon atoms such as isoamyl formate, ethyl acetate, amyl acetate, glycerol acetate, ethylene glycol acetate, methyl acrylate, ethyl acrylate, ethyl maleate, ethyl oxalate, ethyl hydrogentartrate, dimethyl malonate, dimethyl succinate, dimethyl glutarate, dimethyl adipate, dibutyl sebacate, butyllactone, caprolactone, methyl furan-2-carboxylate, methyl picolinate, and methyl nicotinate.

Other esters than esters of the above organic acids which can be used to form the silica sol are ethylene carbonate, phosphate esters such as trimethyl phosphate, triethyl phosphate, tripropyl phosphate, tributyl phosphate, dimethyl phosphate, diethyl phosphate, dipropyl phosphate, monomethyl phosphate, monoethyl phosphate, monopropyl phosphate, and borate esters such as methyl borate and ethyl borate.

Examples of the amides are formamide, dimethylformamide, acetamide, dimethylacetamide, propionamide, butylamide, valeramide, acrylamide, cinnamamide, maleinamic acid, maleuric acid, oxamide, oxamic acid, sebacic amide, citramide, glycollic acid amide, mandelic acid amide, benzamide, phthalamic acid, terephthalic acid amide, caprolactam, α-pyrrolidone, furan-2-carboxylic acid amide, pyrrole-2-carboxylic acid amide, picolinic acid amide and nicotinamide.

Examples of the peroxides are performic acid, peracetic acid, monoperphthalic acid, perbenzic acid, permaleic acid, and persuccinic acid.

Examples of the aldehydes are glutardialdehyde, malonic acid aldehyde, and glyoxal.

Of these organic compounds, aliphatic mono- or divalent carboxylic acids having 1 to 4 carbon atoms and derivatives thereof, ethylene carbonate and phosphate esters are particularly preferred in view of sol-forming capability, influence on pigments, treatments for waste water, etc.

The inorganic compounds which can be used in the invention include phosphorus oxyacids, boric acid (orthoboric acid), alkali metal salts and ammonium salts. Phosphorous oxyacids include orthophosphoric acid, pyrophosphoric acid, phosphinic acid, phosphorous acid, hypophosphoric acid amidophosphoric acid. The alkali metal salts are salts of phosphorous oxyacids, sulfurous oxyacids and carbonic acids such as sodium hydrogensulfite, potassium hydrogensulfite, sodium hydrogensulfate, potassium hydrogensulfate, sodium hydrogencarbonate, potassium hydrogencarbonate, sodium dihydrogenphosphate, potassim dihydrogenphosphate, and sodium dihydrogenpyrophosphate. The ammonium salts are in general salts of a halogen acid, a sulfurous oxyacid, a phosphorous oxyacid, carbonic acid a boron oxyacid or a nitrogen oxyacid such as ammonium chloride, ammonium nitrate, ammonium chlorate, ammonium bromate, ammonium sulfate, ammonium hydrogensulfate, aluminum ammonium sulfate, ammonium zinc sulfate, ammonium sulfite, ammonium hydrogensulfite, ammonium amidosulfate, ammonium thiosulfate, ammonium persulfate, ammonium hydrogencarbonate, ammonium carbonate, ammonium dihydrogenphosphate, ammonium pyrophosphate, ammonium metaphosphate, ammonium hydrogenphosphite, ammonium borate and ammonium perborate. Of these inorganic compounds, phosphoric acid, boric acid, sodium hydrogensulfate sodium hydrogensulfite, sodium hydrogencarbonate, sodium dihydrogenphosphate, ammonium chloride, ammonium nitrate, ammonium sulfate, ammonium hydrogensulfate, ammonium sulfite, ammonium hydrogensulfite, ammonium hydrogencarbonate, ammonium carbonate and ammonium dihydrogenphosphate are particularly preferred for the same reasons as set forth above for the preferred organic compounds.

The compounds listed above may be used independently or as a mixture. Like the alkali silicate, these compounds are preferably used in a low concentration, but this limitation is not as critical as with the aqueous solution of alkali silicate if their type and manner of addition to the slurry of pigment are properly selected. It is absolutely necessary that the reaction for the formation of silica sol in the slurry prepared in the manner described above proceed at a controlled pH and temperature throughout. The silica sol may be formed in the slurry by adding a separately prepared silica sol to the slurry. In most cases, however, the aqueous solution of alkali silicate is reacted with an aqueous solution of the specified organic or inorganic compounds under stirring and atmospheric pressure at a pH of about 7 to 11, preferably about 8 to 11, and at a temperature not lower than about 60° C. and not as high as the boiling point of the system. The pH and temperature control may advantageously be accomplished by adding the two aqueous solutions simultaneously and over an adequately extended period of time such that the pH of the slurry does not vary more than ±0.5 from a predetermined pH within the aforementioned range. However, this is only one example of the method of controlling the pH and temperature of the slurry within the specified range, and if the aqueous solution of the organic or inorganic compound added is either neutral or alkaline, addition of the organic or inorganic compound may precede gradual addition of the aqueous alkali silicate. It is thus essential that the reaction for the formation of the silica sol be carried out slowly under the above conditions, but 6 hours are sufficient to achieve the purpose and, generally, the reaction may be completed within 1 to 4 hours.

As a consequence of the reaction described above, many particles of silica sol are formed within the aqueous slurry of pigment without an adverse effect on the pigment particles. The particles obtained under atmospheric pressure and under the conditions controlled within the stated range contain a lot of silanol groups and/or lower polysiloxane and therefore are very active. The particle size is generally less than 200 mμ, and in most cases, it is less than 100 mμ. Beacuse of this fineness, the particles of silica sol specifically deposit on the pigment particles and form a substantially continuous coat. As a matter of fact, one can observe with an electron microscope the way they cover the pigment particles. According to the many experiments conducted by the inventors of this invention, if the reaction is performed under conditions outside the indicated range, rapid decomposition of the alkali silicate tends to form a porous siloxane bond containing silica gel which results in a heterogeneous coat on the pigment particles. The gel is of high molecular weight and inactive, and it not only forms a heterogeneous coat with respect to the pigment particles but also it fails to deposit on the pigment and assumes a free form. Therefore, neither the method wherein all of the aqueous solution of alkali silicate is added to the slurry at one time and then decomposed through reaction with the organic compound, nor the method wherein the alkali silicate is decomposed rapidly, nor the method wherein it is decomposed under superatmospheric pressure can provide an effective silica coat that increases the resistance of the pigment.

The amount of silica with which the pigment particles are covered according to this invention varies with the use of the pigment, but its content is at least 1 wt % of the total weight of the pigment composition in terms of $SiO_2$, and in most cases, less than about 40 wt % of silica will serve the purpose. The particularly preferred range is from about 3 to 25 wt %. With respect to the particular pigments, a metal powder pigment is preferably coated in an amount of about 3 to 15 wt %, an ultramarine pigment in an amount of about 5 to 20 wt % and other inorganic pigments in an amount of about 5 to 25 wt %. Silica contained in an amount less than about 1 wt % is not capable of covering all particles of the pigment and therefore it cannot enhance the resistance of the pigment to the desired degree. If the silica content exceeds about 40 wt %, the concentration of the pigment becomes so low as to reduce its coloring power.

After formation of the silica sol deposit, the slurry may, if necessary, be held for a suitable period under the conditions used for the reaction, and is then neutralized, followed by filtration of the mother liquor. The pigment composition in which the particles are covered with a uniform coat of the silica sol is thoroughly washed by conventional means until salts are no longer observed, and is then dried. Thereafter, the composition is ground into a pigment of the desired particle size which has remarkably high light resistance, weatherability, chemical resistance, hydrogen sulfide resistance, heat resistance and storage stability. As described in the foregoing, the particles of the pigment compositions prepared by this invention are covered with a continuous coat which is far stronger than expected and demonstrates the great improvement achieved by this invention.

This invention will hereunder be described in greater detail by reference to the following examples which are given here for illustrative purposes only and are by no means intended to limit the scope of the invention.

EXAMPLE 1

100 parts of dried and ground particles of ultramarine (Color Index No. 77007) were dispersed in 1,000 parts of water and stirred at room temperature to form a uniform slurry. An aqueous solution of sodium silicate (JIS No.3) as dispersing agent was added to the slurry to bring the pH within the range of 9.5 to 10.0. The slurry was then passed through a homogenizer to make a uniform dispersion of the pigment particles which was held at a temperature between 90° and 95° C. and controlled at a pH between 9.5 and 10.0 by adding, as required, an aqueous solution of sodium hydroxide under stirring. To the slurry being stirred, 312 parts of an aqueous solution of sodium silicate having a concentration of 4.83 wt % as $SiO_2$ (the solution was referred to as Solution A) and 421 parts of a 3.1 wt % aqueous solution of ammonium chloride (the solution was referred to as Solution B) were added simultaneously at rates of 2.1 parts/min and 2.3 parts/min for Solutions A and B, respectively. Throughout the addition of the two solutions, the slurry was controlled at a pH between 9.5 and 10.0. A fine silica sol resulted to form a uniform deposit on the pigment particles. The slurry as allowed to stand at a pH between 6.5 and 7.0, washed with water by decantation until no more sodium salt was detected, and filtered and dried to provide about 114 parts of an ultramarine composition the particles of which were covered with fine, dense amorphous silica.

EXAMPLES 2–32

The ultramarine was treated by the procedure of Example 1 under the conditions specified in Table 1, and the respective ultramarine compositions having particles covered with fine amorphous silica was provided. Solution A was used in the same manner as in Example 1.

TABLE 1

| | Ultramarine Slurry Reaction System | | Solution B | | | |
|---|---|---|---|---|---|---|
| Ex. No. | pH | Temperature (°C.) | Compound | Cont. (wt %) | Amount Added (parts) | Rate of Addition (parts/min) |
| 2 | 9.5–10.0 | 90–95 | sodium hydrogensulfate | 2.7 | 1,078 | 7.7 |
| 3 | 9.0–9.5 | 85–90 | ammonium amidosulfate | 2.9 | 482 | 3.6 |
| 4 | " | " | ammonium persulfate | 4.3 | 642 | 4.5 |
| 5 | 9.5–10.0 | 90–95 | pyrophosphoric acid | 1.8 | 606 | 4.3 |
| 6 | " | 85–90 | ammonium bromate | 3.6 | 984 | 6.8 |
| 7 | " | " | ammonium nitrate | 2.6 | 745 | 5.4 |
| 8 | " | " | ammonium perchlorate | 3.5 | 815 | 5.9 |
| 9 | " | 90–95 | orthoboric acid | 1.2 | 1,263 | 9.1 |
| 10 | " | " | dimethyl phosphate | 5.0 | 438 | 3.1 |
| 11 | " | " | tributyl phosphate | 1.2 | 1,283 | 9.2 |
| 12 | 9.0–9.5 | 85–90 | ethylboric acid | 3.0 | 213 | 1.5 |
| 13 | 9.5–10.0 | " | triethyl borate | 3.0 | 280 | 2.0 |
| 14 | " | 90–95 | trimethyl borate | 2.5 | 240 | 1.7 |
| 15 | " | " | tripropyl phosphate | 1.0 | 1,300 | 9.3 |
| 16 | 9.0–9.5 | 85–90 | acetamide | 3.1 | 329 | 2.4 |
| 17 | 9.0–9.5 | 85–90 | zinc acetate | 3.5 | 453 | 3.2 |
| 18 | " | 90–95 | pyrrolidone | 4.0 | 368 | 2.6 |
| 19 | " | " | ethylene glycol diacetate | 2.4 | 527 | 3.7 |
| 20 | " | " | ethylene glycol monoacetate | 3.75 | 480 | 3.2 |
| 21 | " | 85–90 | methyl acrylate | 4.5 | 334 | 2.4 |
| 22 | " | 90–95 | glutardialdehyde | 3.5 | 479 | 3.5 |
| 23 | " | " | dimethylformamide | 2.0 | 635 | 4.5 |
| 24 | " | " | aluminum citrate | 6.1 | 606 | 4.3 |
| 25 | " | " | sodium hydrogenoxalate | 4.5 | 298 | 2.7 |
| 26 | " | " | ammonium acetate | 3.5 | 383 | 2.7 |
| 27 | " | " | 1:1 mixture of monopropyl | 6.5 | 413 | 3.0 |

TABLE 1-continued

| Ex. No. | Ultramarine Slurry Reaction System | | Solution B | | | |
|---|---|---|---|---|---|---|
| | pH | Temperature (°C.) | Compound | Cont. (wt %) | Amount Added (parts) | Rate of Addition (parts/min) |
| 28 | " | " | phosphate and dipropyl phosphate acetic acid | 3.75 | 277 | 1.5 |
| 29 | 9.5–10.0 | 85–90 | phenol | 3.3 | 498 | 2.8 |
| 30 | " | " | tartaric acid | 4.33 | 300 | 1.7 |
| 31 | " | " | benzenesulfonic acid | 5.0 | 548 | 3.0 |
| 32 | " | " | glycine | 5.0 | 260 | 1.4 |

EXAMPLE 33

100 parts of dried and ground particles of ultramarine were dispersed in 1,000 parts of water and stirred at room temperature to form a uniform slurry. An aqueous solution of sodium silicate (JIS No. 3) was added to the slurry to bring its pH to within the range of from 9.5 to 10.0. The slurry was then passed through a homogenizer to make a uniform dispersion of pigment particles. An ultrasonic oscillating generator (manufactured by Branson Co., Ltd., U.S.A., resonance freq.: 50 KHz, generator: lead titanate zirconate) was used to generate ultrasonic waves which minimized the formation of secondary particles of ultramarine, while the temperature of the slurry was held between 85° and 90° C. and the pH was held between 9.5 and 10.0 by adding, as required, an aqueous solution of sodium hydroxide. To the slurry being stirred, 312 parts of an aqueous solution of sodium silicate having a concentration of 4.83 wt % as $SiO_2$ (the solution was referred to as Solution A) and 684 parts of a 3.5 wt % aqueous solution of orthophosphoric acid (the solution was referred to as Solution B) were added simultaneously at rates of 2.1 parts/min and 3.8 parts/min for Solutions A and B, respectively. Throughout the addition of the two solutions, the slurry was controlled to have a pH between 9.5 and 10.0. The generation of ultrasonic waves was continued to the end of the reaction. The procedure of Example 1 was repeated to provide about 114 parts of an ultramarine composition the particles of which were covered with fine, dense amorphous silica.

EXAMPLE 34

The procedure of Example 33 was repeated to treat 100 parts of ultramarine except that Solution B comprising 428 parts of a 3.2 wt % aqueous solution of phenyl phosphonic acid was added simultaneously with Solution A at a rate of 3.1 parts/min. About 114 parts of a composition having silica-covered ultramarine particles was provided.

EXAMPLE 35

The procedure of Example 34 was repeated to treat 100 parts of ultramarine except that Solution B comprising 326 parts of a 3.93 wt % aqueous solution of propynoic acid was added simultaneously with Solution A at a rate of 1.8 parts/min. About 114 parts of a composition having silica-covered ultramarine particles was provided.

EXAMPLE 36

Three types of bronze powder (89% Cu and 11% Zn, or 74% Cu and 26% Zn, Color Index No. 77440) were prepared. One type was subjected to conventional preliminary treatment using boric acid (in the similar manner as in Comparative Example 3), the second was subjected to the conventional chromate treatment (in the similar manner as in Comparative Example 4), and the third was subjected to neither surface treatment. 100 parts of each type were dispersed in 700 parts of water containing 0.7 part of a surfactant ("Nonionic OD 100", manufactured by Emulsol Co., Ltd.). The ultrasonic oscillating generator used in Example 33 was used to generate ultrasonic waves that thoroughly dispersed the pigment particles in water, while the slurry was held at a temperature between 90° and 95° C. and a pH between 9.5 and 10.2. To the slurry being stirred, 103 parts of an aqueous solution of sodium silicate having a concentration of 4.83 wt % as $SiO_2$ (the solution was referred to as Solution A) and 320 parts of a 3.0 wt % aqueous solution of sodium hydrogensulfate (the solution was referred to as Solution B) were added simultaneously at rates of 0.69 part/min (Solution A) and 1.8 parts/min (Solution B) while the pH was controlled to rest between 9.5 and 10.2. A fine silica sol resulted to form a uniform deposit on the pigment particles. The pH of the slurry was adjusted to a level between 7.0 and 7.5 by the conventional method, and then the slurry was washed with water, filtered and dried. About 103 parts of a bronze powder composition having particles covered with fine amorphous silica was provided from each type of bronze powder.

EXAMPLES 37–65

100 parts each of the metal powder pigments listed in Table 2 below and having average particle sizes of 18μ, 20μ, 25μ and 35μ were treated by the procedure of Example 36 under the conditions specified in Table 2, and the respective metal powder pigment compositions having particles covered with fine amorphous silica was provided. Solution A was used in the manner, rate and amount in Example 36.

TABLE 2

| Ex. No. | Metal Powder Pigment Slurry Reaction System | | | Solution B | | | |
|---|---|---|---|---|---|---|---|
| | Metal Powder Pigment | pH | Temp. (°C.) | Compound | Cont. (wt %) | Amount Added (parts) | Rate of Addition (parts/min) |
| 37 | Bronze powder | 9.0–9.5 | 85–90 | Sodium hydrogencarbonate | 3.2 | 209 | 1.2 |
| 38 | " | " | 90–95 | Potassium persulfate | 4.4 | 245 | 1.4 |
| 39 | " | 9.5–10.2 | " | Valeric acid | 2.55 | 231 | 1.3 |
| 40 | " | " | " | Citric acid | 4.07 | 99 | 0.55 |
| 41 | " | " | 85–90 | Anthranilic acid | 1.0 | 787 | 4.4 |

TABLE 2-continued

| Ex. No. | Metal Powder Pigment Slurry Reaction System | | | Solution B | | | |
|---|---|---|---|---|---|---|---|
| | Metal Powder Pigment | pH | Temp. (°C.) | Compound | Cont. (wt %) | Amount Added (parts) | Rate of Addition (parts/min) |
| 42 | " | 9.0–9.5 | 90–95 | Mellitic acid | 2.4 | 139 | 0.8 |
| 43 | " | " | 85–90 | Pyridiretetracarboxylic acid | 3.2 | 119 | 0.7 |
| 44 | " | " | " | Glutamic acid | 2.0 | 212 | 1.2 |
| 45 | " | " | 90–95 | o-Cresol | 1.3 | 476 | 2.6 |
| 46 | " | 9.5–10.2 | " | Methylsulfonic acid | 5.0 | 110 | 0.6 |
| 47 | " | " | " | Butyrolactone | 4.1 | 121 | 0.7 |
| 48 | " | 9.0–9.5 | 85–90 | Zinc acetate | 5.0 | 210 | 1.2 |
| 49 | " | " | " | Ethyl acetate | 4.2 | 121 | 0.7 |
| 50 | " | " | " | Acetamide | 2.0 | 86 | 0.5 |
| 51 | Pure silver powder | " | " | Sodium hydrogensulfite | 3.2 | 259 | 1.4 |
| 52 | " | 9.0–9.5 | 90–95 | Furancarboxylic acid | 3.4 | 189 | 1.0 |
| 53 | " | 9.5–10.2 | " | Phenol | 3.3 | 165 | 0.9 |
| 54 | Zinc dust | 8.0–9.5 | 85–90 | Orthophosphoric acid | 3.5 | 226 | 1.3 |
| 55 | " | " | " | Crotonic acid | 5.0 | 99 | 0.5 |
| 56 | " | " | " | 2-Pyridinecarboxylic acid | 4.4 | 161 | 0.9 |
| 57 | Tin powder | 9.0–9.5 | " | Ammonium hydrogenphosphite | 3.3 | 239 | 1.3 |
| 58 | " | " | " | Thiophenecarboxylic acid | 1.0 | 734 | 4.1 |
| 59 | " | " | " | Trimethyl phosphate | 2.3 | 116 | 0.6 |
| 60 | Copper powder | " | 90–95 | Sodium dihydrogenphosphate (monohydrate) | 3.7 | 300 | 1.7 |
| 61 | " | " | 85–90 | Oxalic acid | 2.96 | 123 | 0.7 |
| 62 | " | " | " | Pimelic acid | 2.73 | 176 | 1.0 |
| 63 | " | 9.5–10.2 | " | Pyrogallol | 1.0 | 238 | 1.3 |
| 64 | " | 9.0–9.5 | 90–95 | Ethylboric acid | 1.8 | 115 | 0.6 |
| 65 | " | 9.5–10.2 | " | Glyoxal | 3.1 | 107 | 0.6 |

EXAMPLE 66

The procedure of Example 1 was repeated to make a slurry of 100 parts of ultramarine having a temperature and pH held between 90° and 95° C., and between 9.5 and 10.0, respectively. To the slurry, 380 parts of a 4.0 wt % aqueous solution of ethylene carbonate (Solution B) were added over a period of 20 minutes, stirred for 10 more minutes, and mixed with 312 parts of an aqueous solution of sodium silicate having a concentration of 4.83 wt % as $SiO_2$ which was added at a rate of 2.1 parts/min. Throughout the addition of the two solutions, the slurry was held at a pH within the range of from 9.5 to 10.0. A fine silica sol resulted to form a uniform deposit on the pigment particles. The procedure of Example 1 was repeated to provide about 114 parts of an ultramarine composition having its particles covered with fine, dense amorphous silica.

EXAMPLES 67–69

The ultramarine was treated by the procedure of Example 66 under the conditions specified in Table 3, and the respective ultramarine compositions having particles covered with fine amorphous silica was provided. Solution A was used in the manner, rate and amount in Example 66.

TABLE 3

| Example No. | Ultramarine Slurry Reaction System | | Solution B | | |
|---|---|---|---|---|---|
| | pH | Temp. (°C.) | Compound | Cont. (wt %) | Amount Added (parts) |
| 67 | 9.5–10.0 | 85–90 | Glycerol triacetate | 7.0 | 180 |
| 68 | " | " | Ethyl acetate | 5.0 | 305 |
| 69 | " | 90–95 | L-Proline | 5.88 | 340 |

EXAMPLE 70

The procedure of Example 36 was repeated to make a slurry of 100 parts of bronze powder (average particle size: 25μ; 89% Cu and 11% Zn, or 74% Cu and 26% Zn) at a temperature between 90° and 95° C. and a pH between 9.5 and 10.2. To the slurry, 529 parts of a 1.59 wt % aqueous solution of L-lysine (Solution B) were added over a period of 20 minutes, stirred for 10 more minutes, and mixed with 103 parts of an aqueous solution of sodium silicate having a concentration of 4.83 wt % as $SiO_2$ which was added at a rate of 0.57 part/min. Throughout the addition of the two solutions, the slurry was held at a pH within the range of from 9.5 to 10.2. A fine silica sol resulted to form a uniform deposit on the pigment particles. The procedure of Example 36 was repeated to provide about 103 parts of a bronze powder composition having its particles covered with fine, dense amorphous silica.

EXAMPLES 71 & 72

The bronze powder was treated by the procedure of Example 70 under the conditions specified in Table 4, and the respective bronze powder compositions having particles covered with fine amorphous silica was provided. Solution A was used in the manner, rates and amounts in Example 70.

TABLE 4

| Ex. No. | Ultramarine Slurry Reaction System | | Solution B | | |
|---|---|---|---|---|---|
| | pH | Temp. (°C.) | Compound | Cont. (wt %) | Amount Added (parts) |
| 71 | 9.5–10.2 | 85–90 | Hydroquinone | 3.5 | 91 |
| 72 | " | 90–95 | m-Aminophenol | 1.0 | 628 |

EXAMPLE 73

The procedure of Example 1 was repeated to treat 100 parts of ultramarine except that Solution B comprising 388 parts of a 4.0 wt % aqueous solution of ethyl hydrogen-tartrate and 261 parts of a 3.4 wt % aqueous solution of propyl acetate was added simultaneously with Solution A at a rate of 3.6 parts/min. About 114 parts of composition having silica-covered ultramarine particles was provided.

EXAMPLE 74

The procedure of Example 1 was repeated to treat 100 parts of ultramarine except that Solution B comprising 183 parts of a 4.1 wt % aqueous solution of butyrolactone and 199 parts of a 3.5 wt % aqueous solution of ammonium acetate was added simultaneously with Solution A at a rate of 2.1 parts/min. About 114 parts of a composition having silica-covered ultramarine particles was provided.

EXAMPLE 75

The procedure of Example 1 was repeated to treat 100 parts of ultramarine except that Solution B comprising 138.5 parts of a 3.75 wt % aqueous solution of acetic acid and 349 parts of a 2.55 wt % aqueous solution of valeric acid was added simultaneously with Solution A at a rate of 3.5 parts/min. About 114 parts of composition having silica-covered ultramarine particles was provided.

EXAMPLE 76

The procedure of Example 36 was repeated to treat 100 parts of bronze powder (89% Cu and 11% Zn, average particle size: 35 $\mu$) except that Solution B comprising 105 parts of a 5.0 wt % aqueous solution of zinc acetate and 115 parts of a 2.55 wt % aqueous solution of valeric acid was added simultaneously with Solution A at a rate of 1.2 parts/min. About 103 parts of a composition having silica-covered bronze powder particles was provided.

EXAMPLE 77

The procedure of Example 36 was repeated to treat 100 parts of bronze powder (74% Cu and 26% Zn, average particle size: 18$\mu$) except that Solution B comprising 134 parts of a 3.5 wt % aqueous solution of orthophosphoric acid and 167 parts of a 1.2 wt % aqueous solution of orthoboric acid was added simultaneously with Solution A at a rate of 1.4 parts/min. About 103 parts of a composition having silica-covered bronze powder particles was provided.

EXAMPLE 78

The procedure of Example 1 was repeated to prepare a slurry of 100 parts of ultramarine, and a 4.83 wt % aqueous solution of sodium silicate (Solution A) and 6.4 wt % aqueous solution of sodium hydrogencarbonate (Solution B) were added simultaneously to the slurry in the amounts and at the rates of addition specified in Table 5 below. Ultramarine compositions having particles covered with different proportions of fine amorphous silica were provided as shown in Table 5.

TABLE 5

| Run No. | Solution A | | Solution B | | |
| --- | --- | --- | --- | --- | --- |
| | Amount (parts) | Rate of Addition (parts/min) | Amount (parts) | Rate of Addition (parts/min) | SiO$_2$ (wt %) |
| 1 | 82.8 | 2.1 | 84.0 | 1.8 | 3.9 |
| 2 | 207.0 | 2.3 | 210.1 | 2.0 | 9.2 |
| 3 | 518.0 | 2.9 | 525.1 | 2.5 | 20.2 |
| 4 | 828.0 | 3.4 | 840.2 | 3.0 | 28.8 |

EXAMPLE 79

The procedure of Example 36 was repeated to prepare a slurry of 100 parts of a bronze powder (85% Cu and 11% Zn, average particle size: 25$\mu$), and a 4.83 wt % aqueous solution of sodium silicate (Solution A) and a 2.74 wt % aqueous solution of formic acid (Solution B) were added simultaneously to the slurry in the amounts and at the rates of addition specified in Table 6 below. Bronze powder compositions having particles covered with different proportions of fine amorphous silica were provided as shown in Table 6.

TABLE 6

| Run No. | Solution A | | Solution B | | |
| --- | --- | --- | --- | --- | --- |
| | Amount (parts) | Rate of Addition (parts/min) | Amount (parts) | Rate of Addition (parts/min) | SiO$_2$ (wt %) |
| 1 | 31.5 | 0.8 | 29.7 | 0.6 | 1.5 |
| 2 | 178.0 | 1.9 | 167.6 | 1.5 | 8.0 |
| 3 | 366.5 | 2.4 | 345.2 | 1.9 | 15.0 |
| 4 | 652.2 | 3.6 | 614.2 | 2.9 | 24.0 |

COMPARATIVE EXAMPLE 1

100 parts of dried and ground particles of ultramarine were dispersed in 1,000 parts of water and stirred to form a uniform slurry. An aqueous solution of sodium silicate (JIS No. 3) was added to the slurry as a dispersant. The slurry was passed through a homogenizer to make a uniform dispersion of the pigment particles. The dispersion was held at a temperature between 90° and 95° C. and adjusted to a pH between 9.0 and 9.5 by adding, as required, an aqueous solution of sodium hydroxide. To the slurry, 312 parts of an aqueous solution of sodium silicate, JIS No. 3, having a concentration of 4.83 wt % as SiO$_2$ was added at a rate of 2.1 parts/min. The subsequent procedure was identical to that of Example 1.

COMPARATIVE EXAMPLE 2

100 parts of dried and ground particles of ultramarine were dispersed in 1,000 parts of water and stirred to form a uniform slurry. An aqueous solution of sodium silicate, JIS No. 3, was added to the slurry, which was then passed through a homogenizer to make a uniform dispersion of the pigment particles. The dispersion was held at a temperature between 90° and 95° C. and controlled to have a pH between 9.0 and 9.5 by adding, as required, an aqueous solution of sodium hydroxide. To the slurry being stirred, 312 parts of an aqueous solution of sodium silicate, JIS No. 3, having a concentration of 4.83 wt % as SiO$_2$ (Solution A) and 348 parts of a 2.3 wt % aqueous solution of sulfuric acid (Solution B) were added simultaneously at rates of 2.1 parts/min and 1.9 parts/min for Solutions A and B, respectively. Throughout the addition of the two solutions, the slurry was controlled to have a pH between 9.0 and 9.5. The subsequent procedure was the same as that of Example 1. The sulfuric acid comprising Solution B attacked the particles of ultramarine which gradually turned white giving off an irritating smell characteristic of hydrogen sulfide, and by the time about one-half the volume of Solution B was added, they were snow-white without any bluish hue and looked like a white pigment.

COMPARATIVE EXAMPLE 3

Four different types of bronze powder (average particle size: 18μ, 20μ, 25μ, 35μ; 89% Cu and 11% Zn, or 74% Cu and 26% Zn) were mixed with 200 cc of either a solution of 20 parts of boric acid in methyl alcohol and ethyl alcohol, or an aqueous solution of 20 parts of boric acid and anhydrous borax (1:1) in methyl/ethyl alcohol (volume ratio of alcohol to water=1:1) under stirring, the mixture was left to stand for a period of about 1 hour, filtered, dried, heated at a temperature between 250 and 300° C. for the first type solution, and between 450° and 500° C. for the second type of solution, then cooled to provide heat-resistant bronze powder particles.

COMPARATIVE EXAMPLE 4

Four different types of bronze powder (average particle size: 18μ, 20μ, 25μ, 35μ; 89% Cu and 11% Zn, or 74% Cu and 26% Zn) were immersed in a mixture of 15 parts of water, 1 part of chromic anhydride, 0.1 cc of 85% phosphoric acid and 35 parts of dioxane, stirred at 60° C. for a period of 60 minutes, filtered, dried, subjected to chromate treatment to provide heat-resistant bronze powder particles.

EXAMPLE 80

The performance of the ultramarine and metal powder pigment compositions prepared in the above examples and comparative examples as well as control ultramarine and metal powder pigment compositions was evaluated in the following tests.

EVALUATION OF ULTRAMARINE PIGMENTS AND RESULTS

1. Acid Resistance Test 80 parts of a melamine alkyd resin were mixed with 10 parts of an ultramarine specimen, 10 parts of titanium oxide, 20 parts of xylol and 200 parts of beads, and the mixture was stirred in a paint shaker for 30 minutes to form a uniform dispersion. The dispersion was filtered to separate the beads. The filtrate was applied to a specified steel sheet by an applicator, left to stand for 30 minutes, and baked at 150° C. for 30 minutes to thereby obtain a test piece. The test piece was immersed in 5% aqueous sulfuric acid at 50° C. for a period of 8 hours.

Results (i) Products of Examples 1–35, 66–69, 73–75 and 78:

No discoloration observed. Kept bright blue color.
(ii) Products of Comparative Example 1;

Turned white and the color of ultramarine was completely lost.
(iii) Controls (untreated pigments):

Turned white and the color of ultramarine was completely lost.

Unexpectedly, many of the ultramarine compositions prepared in the Examples were not decomposed even when they were contacted by concentrated hydrochloric acid and, instead, they remained stable, keeping the ultramarine color for an extended period of time. This bespeaks the great difference between the silica coating of this invention and that of the conventional techniques, and how much tougher the former is.

2. Alkali Resistance Test

An intimate mixture of 32 parts of Portland cement, 65 parts of river sand, 3 parts of an ultramarine specimen and 20 parts of water was placed in a 100 ml polyethylene beaker, heated with steam at a temperature between 85° and 90° C. for 5 hours, and solidified quickly. The resulting change in the color of the specimen was checked.

Results (i) Products of Examples 1–35, 66–69, 73–75 and 78:

No change observed. Kept the ultramarine color.
(ii) Products of Comparative Example 1:

Turned white and the color of ultramarine was completely lost.
(iii) Controls (untreated pigments):

Turned white and the color of ultramarine was completely lost.

3. Heat Resistance Test

A mixture of 100 parts of polyethylene pellets from medium-low pressure polymerization process and 0.5 part of an ultramarine specimen was held at 320° C. for 10 minutes during which it was injection-molded to form panels.

Results (i) Products of Examples 1–35, 66–69, 73–75 and 78:

No color change observed. Kept the ultramarine color.
(ii) Products of Comparative Example 1:

Brightness decreased appreciably.
(iii) Controls (untreated pigments):

Brightness decreased appreciably.

Evaluation of Metal Powder Pigments and Results

1. Hydrogen Sulfide Resistance Test

A 50 g sample of a mixture of 100 parts of PVC (soft), 50 parts of DOP, 0.5 part of barium stearate, and 0.5 part of calcium stearate was mixed with 0.5 part of a specimen of metal powder pigment and milled with a heated roll at 160° C. for 3 minutes until a sheet was formed. The sheet was cut into test pieces of a suitable size, which was immersed in saturated hydrogen sulfide water at room temperature for 1 hour. The resulting change in color was checked both visually and with a color difference meter.

Results (i) Products of Examples 36–65, 70–72, 76–77 and 79:

No change observed. Kept the original bright metallic color.
(ii) Products of Comparative Examples 3 and 4:

Turned black as a result of contact with hydrogen sulfide.
(iii) Controls (untreated):

Turned white or black as a result of contact with hydrogen sulfide. Initial change due to heat or chlorine gas occurred during the preparation of the test piece.

2. Acid Resistance Test (1) A sheet of test piece the same as what was used in the hydrogen sulfide resistance test was immersed in an aqueous solution of acetic acid (acetic acid to water=1:5) at room temperature for 3 hours. The resulting change in color was checked both visually and with a color difference meter.

(2) A uniform dispersion of 10 parts of a metal powder pigment specimen and 100 parts of mica was prepared. A mixture of a urea resin and a curing agent (2% aqueous solution of ammonium chloride) was added to the dispersion under stirring to form an intimate mixture. The mixture was dried at 110°–120° C. for 4 hours and the resulting color change was observed visually.

Results (i) Products of Examples 36–65, 70–72, 76–77 and 79:

No change observed.

(ii) Products of Comparative Examples 3 and 4:

Considerable change observed.

(iii) Controls (untreated):

Considerable change observed.

3. Heat Resistance Test (1) A mixture of 100 parts of polyethylene powder from medium-low pressure polymerization process and 1 part of a metal powder pigment specimen was held at different temperatures between 200° and 240° C. for 5 minutes during which it was injection-molded to form panels.

(2) Two mixtures of 100 parts of polypropylene powder and 0.5 part of a metal powder pigment specimen were prepared. One of them was held at 200° C. for 20 seconds, and the other was held at 250° C. for 3 minutes, during which they were injection-molded to form panels.

(3) 80 parts of an oil free alkyd resin were mixed with 20 parts of a metal powder pigment specimen and 200 parts of beads, and the mixture was stirred in a paint shaker for 30 minutes to form a uniform dispersion. The dispersion was filtered to separate the beads. The filtrate was applied to a specified steel sheet by an applicator, left to stand for 30 minutes, and baked at a temperature of 270° C., 280° C. or 290° C. for 10 minutes. The resulting color change was observed.

(4) A metal powder pigment specimen was baked under three different conditions, i.e., at 240° C. for 30 minutes, 240° C. for 1 hour, and 260° C. for 1 hour, and the resulting color change was observed.

Results (i) Products of Examples 36–65, 70–72, 76–77 and 79:

Little change observed in each test. Kept bright metallic color.

(ii) Products of Comparative Examples 3 and 4:

Brightness decreased appreciably in tests (1), (2) and (3). Turned black in test (4).

(iii) Control (untreated pigment):

Brightness decreased in tests (1), (2) and (3). Turned completely white or black in test (4).

EXAMPLE 81

100 parts of dried and ground particles of chrome yellow (Color Index No. 77600, No. 77601 or No. 77603) were dispersed in 840 parts of water and stirred at room temperature to form a uniform slurry. An aqueous solution of sodium silicate (JIS No. 3) was added to the slurry to bring the pH within the range of 9.0 to 10.0. The slurry was then passed through a homogenizer to make a uniform dispersion of the pigment particles which was held at a temperature between 85° and 90° C. and controlled at a pH between 9.0 and 10.0 by adding, as required, an aqueous solution of sodium hydroxide under stirring. To the slurry being stirred, 500 parts of an aqueous solution of sodium silicate JIS No. 3 having a concentration of 4.83 wt % as $SiO_2$ (the solution was referred to as Solution A) and 471 parts of a 2.74 wt % aqueous solution of formic acid (the solution was referred to as Solution B) were added simultaneously at rates of 3.4 parts/min and 2.6 parts/min for Solutions A and B, respectively. Throughout the addition of the two solutions, the slurry was controlled at a pH between 9.0 and 10.0. A fine silica sol resulted to form a uniform deposit on the pigment particles. The slurry was allowed to stand at a pH between 6.5 and 7.0, washed with water by decantation until no more sodium salt was detected, and filtered and dried at 110° C. for 6 hours to provide about 120 parts of a chrome yellow composition the particles of which were covered with fine, dense amorphous silica.

EXAMPLE 82

100 parts of dried and ground particles of chrome vermilion (Color Index No. 77605) were dispersed in 840 parts of water and stirred at room temperature to form a uniform slurry. An aqueous solution of sodium silicate (JIS No. 3) was added to the slurry to bring the pH within the range of from 9.0 to 10.0. The procedure of Example 81 was repeated to prepare a slurry having a temperature between 90° and 95° C. and a pH between 9.0 and 10.0. To the slurry being stirred, 500 parts of an aqueous solution of sodium silicate (JIS No. 3) having a concentration of 4.83 wt % as $SiO_2$ (the solution was referred to as Solution A) and 675 parts of a 3.6 wt % aqueous solution of orthoboric acid (the solution was referred to as Solution B) were added simultaneously at rates of 3.4 parts/min and 3.7 parts/min for Solutions A and B, respectively. Throughout the addition of the two solutions, the slurry was controlled at a pH between 9.0 and 10.0. A fine silica sol resulted to form a uniform deposit on the pigment particles. The procedure of Example 81 was repeated to provide about 120 parts of a chrome vermilion composition the particles of which were covered with fine, dense amorphous silica.

EXAMPLE 83

100 parts of a synthetic yellow iron oxide pigment (Color Index No. 77492) were dispersed in 480 parts of water containing 0.48 part of ferric chloride, and stirred at room temperature to form a uniform slurry. The procedure of Example 81 was repeated to prepare a slurry having a temperature between 90° and 95° C. and a pH between 9.0 and 10.0. To the slurry being stirred, 128 parts of sodium silicate solution having a concentration of 4.83 wt % as $SiO_2$ (the solution was referred to as Solution A) and 123 parts of a 5.0 wt % aqueous solution of crotonic acid (the solution was referred to as Solution B) were added simultaneously at rates of 0.9 part/min and 0.7 part/min for Solutions A and B, respectively. Throughout the addition of the two solutions, the slurry was controlled at a pH between 9.0 and 10.0. The procedure of Example 81 was repeated to provide about 106 parts of a synthetic yellow oxide pigment composition the particles of which were covered with fine, dense amorphous silica.

EXAMPLE 84

The procedure of Example 83 was repeated to treat 100 parts of red oxide (Color Index No. 77491) except that 281 parts of a 3.5 wt % aqueous solution of orthophosphoric acid were added as Solution B at a rate of 1.5 parts/min. About 106 parts of a red oxide composition the particles of which were covered with fine, amorphous silica was provided.

EXAMPLE 85

The procedure of Example 83 was repeated to treat 100 parts of iron black (Color Index No. 77499) except that 287 parts of a 2.55 wt % aqueous solution of valeric acid were added as Solution B at a rate of 1.6 parts/min. About 106 parts of an iron black composition the particles of which were covered with fine, amorphous silica was provided.

EXAMPLE 86

The procedure of Example 81 was repeated to disperse 100 parts of cadmium yellow (Color Index No. 77199) in 840 parts of water and prepare a slurry of cadmium yellow having a temperature between 85° and 90° C. and a pH between 9.0 and 10.0. To the slurry being stirred, 456 parts of an aqueous solution of sodium silicate having a concentration of 4.83 wt % as $SiO_2$ (the solution was referred to as Solution A) and 452 parts of a 5.0 wt % aqueous solution of butyric acid (the solution was referred to as Solution B) were added simultaneously at rates of 3.0 part/min and 2.5 parts/min for Solutions A and B, respectively. A fine silica sol resulted to form a uniform deposit on the pigment particles. The slurry was allowed to stand at a pH between 6.5 and 7.0, and the procedure of Example 81 was repeated to provide about 119 parts of a cadmium yellow composition the particles of which were covered with a fine, dense amorphous silica.

EXAMPLE 87

100 parts of well ground antimony trioxide (Color Index No. 77052) were dispersed in 1,000 parts of water and stirred at room temperature to form a uniform slurry. The procedure of Example 81 was repeated to prepare a uniform dispersion of antimony trioxide having a temperature between 90° and 95° C. and a pH between 9.0 and 10.0. To the slurry being stirred, 128 parts of an aqueous solution of sodium silicate having a concentration of 4.83 wt % as $SiO_2$ (the solution was referred to as Solution A) and 123 parts of a 4.07 wt % aqueous solution of citric acid (the solution was referred to as Solution B) were added simultaneously at rates of 0.9 part/min and 0.7 part/min for Solutions A and B, respectively. Throughout the addition of the two solutions, the slurry was controlled to have a pH between 9.0 and 10.0. The procedure of Example 81 was repeated to provide about 106 parts of an antimony trioxide composition the particles of which were covered with fine, dense amorphous silica.

EXAMPLE 88

100 parts of white lead (Color Index No. 77597) were dispersed in 1,000 parts of water, and under the conditions specified in Table 7 below, the procedure of Example 81 was repeated to provide about 114 parts of a white lead composition the particles of which were covered with fine, dense amorphous silica.

EXAMPLES 89–101

The pigments listed below were treated by the procedure of Example 88 under the conditions specified in Table 7, and the respective pigment compositions having particles coated with fine, dense amorphous silica were provided.

Example 89: titanium dioxide (Color Index No. 77891)
Example 90: titanium yellow
Example 91: lithopone (Color Index No. 77115)
Example 92: zinc oxide (Color Index No. 77947)
Example 93: red lead (Color Index No. 77578)
Example 94: litharge (Color Index No. 77577)
Example 95: cobalt violet (Color Index No. 77360 )
Example 96: cobalt blue (Color Index No. 77346)
Example 97: cobalt green (Color Index No. 77335)
Example 98: manganese violet (Color Index No. 77742)
Example 99: manganese blue (Color Index No. 77112)
Example 100: viridian (Color Index No. 77289)
Example 101: chromium oxide green (Color Index No. 77288)

TABLE 7

| Ex. No. | Pigment Slurry Reaction System pH | Temp. (°C.) | Aqueous Solution of Sodium Silicate Having Cont. of 4.83 wt % as $SiO_2$ (Solution A) Amount Added (parts) | Rate of Addition (parts/min) | Solution B Compound | Cont. (wt %) | Amount Added (parts) | Rate of Addition (parts/min) |
|---|---|---|---|---|---|---|---|---|
| 88 | 9.5–10.0 | 90–95 | 312 | 2.1 | ammonium sulfate | 4.2 | 382 | 2.1 |
| 89 | " | " | " | " | pimelic acid | 2.73 | 533 | 2.9 |
| 90 | " | " | " | " | ammonium persulfate | 4.3 | 642 | 3.6 |
| 91 | 9.0–9.5 | 85–90 | " | " | phenol | 3.3 | 500 | 2.8 |
| 92 | " | 90–95 | " | " | ammonium nitrate | 2.6 | 745 | 4.1 |
| 93 | 9.5–10.0 | " | 210 | 1.4 | trimethyl phosphate | 2.3 | 237 | 1.3 |
| 94 | 9.0–9.5 | " | " | " | ammonium borate | 3.6 | 663 | 3.7 |
| 95 | 9.5–10.0 | " | " | " | tartaric acid | 4.33 | 202 | 1.1 |
| 96 | 9.0–9.5 | " | " | " | pyridinetetracarboxylic acid | 3.2 | 243 | 1.4 |
| 97 | 9.5–10.0 | " | " | " | ammonium hydrogencarbonate | 4.8 | 269 | 1.5 |

TABLE 7-continued

| | Pigment Slurry Reaction System | | Aqueous Solution of Sodium Silicate Having Cont. of 4.83 wt % as SiO₂ (Solution A) | | Solution B | | | |
|---|---|---|---|---|---|---|---|---|
| Ex. No. | pH | Temp. (°C.) | Amount Added (parts) | Rate of Addition (parts/min) | Compound | Cont. (wt %) | Amount Added (parts) | Rate of Addition (parts/min) |
| 98 | " | " | " | " | thiophene carboxylic acid | 1.0 | 1,496 | 8.3 |
| 99 | " | " | " | " | furancarboxylic acid | 3.4 | 385 | 2.1 |
| 100 | " | " | " | " | methylsulfonic acid | 5.0 | 224 | 1.2 |
| 101 | 9.0–9.5 | " | " | " | pyrogallol | 1.0 | 485 | 2.7 |

EXAMPLE 102

The procedure of Example 81 was repeated to treat 100 parts of chrome yellow except that Solution B comprising a mixture of 549 parts of a 3.5 wt % aqueous solution of orthophosphoric acid and 337 parts of a 3.6 wt % aqueous solution of orthoboric acid was added simultaneously with Solution A at a rate of 4.9 parts/min. About 120 parts of a composition having fine, amorphous silica-covered chrome yellow particles was provided.

EXAMPLE 103

The procedure of Example 82 was repeated to treat 100 parts of chrome vermilion except that Solution B comprising a mixture of 294 parts of a 4.1 wt % aqueous solution of butyrolactone and 260 parts of a 3.1 wt % aqueous solution of glyoxal was added simultaneously with Solution A at a rate of 3.0 parts/min. About 120 parts of a composition having fine, amorphous silica-covered chrome vermilion particles was provided.

EXAMPLE 104

The procedure of Example 83 was repeated to treat 100 parts of a synthetic yellow iron oxide pigment except that Solution B comprising a mixture of 111 parts of a 5.4 wt % aqueous solution of sodium hydrogensulfate and 157 parts of a 2.1 wt % aqueous solution of ammonium sulfate was added simultaneously with Solution A at a rate of 1.5 parts/min. About 106 parts of a composition having fine, amorphous silica-covered synthetic yellow iron oxide particles was provided.

EXAMPLE 105

The procedure of Example 87 was repeated to treat 100 parts of antimony trioxide except that Solution B comprising 72 parts of a 2.3 wt % aqueous solution of trimethyl phosphate and 99 parts of a 3.13 wt % aqueous solution of ethylene glycol monoacetate was added simultaneously with Solution A at a rate of 1.0 part/min. About 106 parts of a composition having fine, amorphous silica-covered antimony trioxide particles was provided.

EXAMPLE 106

The procedure of Example 93 was repeated to treat 100 parts of red lead except that Solution B comprising 128 parts of a 3.5 wt % aqueous solution of ammonium acetate and 216 parts of a 2.0 wt % aqueous solution of glutamic acid was added simultaneously with Solution A at a rate of 1.9 parts/min. About 109 parts of a composition having fine, amorphous silica-covered red lead particles was provided.

EXAMPLE 107

100 parts of dried and ground particles of chrome yellow were dispersed in 840 parts of water and stirred at room temperature to form a uniform slurry. An aqueous solution of sodium silicate (JIS No. 3) was added to the slurry to bring its pH to within the range of from 9.0 to 10.0. The slurry was then passed through a homogenizer to make a uniform dispersion of pigment particles. An ultrasonic oscillating generator (manufactured by Branson Co., Ltd., U.S.A., resonance freq.: 50 XHz, generator: lead titanate zirconate) was used to generate ultrasonic waves which minimized the formation of secondary particles of chrome yellow, while the temperature of the slurry was held between 90° and 95° C. and the pH was held between 9.0 and 10.0 by adding, if required, an aqueous solution of sodium hydroxide. To the slurry being stirred, 500 parts of an aqueous solution of sodium silicate having a concentration of 4.83 wt % of SiO₂ (the solution was referred to as Solution A) and 689 parts of a 6.5 wt % aqueous solution of a 1:1 mixture of monopropyl phosphate and dipropyl phosphate (the solution was referred to as Solution B) were added simultaneously at rates of 3.4 parts/min and 3.8 parts/min Solutions A and B, respectively. Throughout the addition of the two solutions, the slurry was controlled to have a pH between 9.0 and 10.0. The generation of ultrasonic waves was continued to the end of the reaction. The procedure of Example 81 was repeated to provide about 120 parts of a chrome yellow composition the particles of which were covered with fine, dense amorphous silica.

EXAMPLE 108

100 parts of a synthetic yellow iron oxide pigment were dispersed in 480 parts of water containing 0.48 part of ferric chloride and stirred at room temperature to form a uniform dispersion. To the slurry prepared as in Example 107, 128 parts of an aqueous solution of sodium silicate having a concentration of 4.83 wt % as SiO₂ (the solution was referred to as Solution A) and 107 parts of a 2.0 wt % aqueous solution of acetamide (the solution was referred to as Solution B) were added simultaneously at rates of 0.9 part/min and 0.6 part/min for Solutions A and B, respectively. The generation of ultrasonic waves was continued throughout the addition of the two solutions, as in Example 107. The procedure of Example 83 was repeated to provide about 106 parts of a synthetic yellow oxide pigment the particles of which were covered with a fine, dense amorphous silica.

EXAMPLE 109

The procedure of Example 81 was repeated to make a slurry of 100 parts of chrome yellow having a temperature and pH held between 85° and 90° C., and between 9.0 and 10.0, respectively. To the slurry, 607 parts of a 4.0 wt % aqueous solution of ethylene carbonate (Solution B) were added over a period of 20 minutes, stirred for 10 more minutes, and mixed with 500 parts of an aqueous solution of sodium silicate having a concentration of 4.83 wt % as $SiO_2$ which was added at a rate of 3.4 parts/min. Throughout the addition of the two solutions, the slurry was held at a pH within the range of from 9.0 to 10.0. A fine silica sol resulted to form a uniform deposit on the pigment particles. The procedure of Example 81 was repeated to provide about 120 parts of a chrome yellow composition having its particles covered with fine, dense amorphous silica.

EXAMPLES 110–115

The procedure of Example 109 was repeated under the conditions indicated in Table 8 below to provide six pigment compositions.

TABLE 8

| | Pigment Slurry Reaction System | | | Aqueous Solution of Sodium Silicate Having Cont. of 4.83 wt % as $SiO_2$ (Solution A) | | Solution B | | |
|---|---|---|---|---|---|---|---|---|
| Example No. | Pigment | pH | Temperature (°C.) | Amount Added (parts) | Rate of Addition (parts/min) | Compound | Cont. (wt %) | Amount Added (parts) |
| 110 | chrome vermilion | 9.0–10.0 | 90–95 | 500 | 3.4 | glycerol triacetate | 7.0 | 287 |
| 111 | synthetic yellow iron oxide | 9.5–10.0 | 85–95 | 128 | 0.9 | ethyl acetate | 5.0 | 126 |
| 112 | red oxide | " | " | " | 0.9 | L-proline | 5.88 | 139 |
| 113 | iron black | " | " | " | 0.9 | L-lysine | 1.59 | 657 |
| 114 | antimony trioxide | 9.0–10.0 | 90–95 | " | 0.9 | hydroquinone | 3.5 | 113 |
| 115 | red lead | 9.5–10.0 | " | 210 | 1.4 | aminophenol | 2.0 | 628 |

EXAMPLE 116

1,000 parts of a 0.4% aqueous solution of sodium hydroxide were added to 100 parts of synthetic yellow iron oxide pigment, and the mixture was subjected to a 5 hour hydrothermal treatment at 180° C. and 10 kg/cm². After thorough washing with water by decantation, a dispersing mill was used to redisperse the pigment particles to obtain the initial slurry concentration, and an aqueous solution of sodium silicate (JIS No. 3) was added to the resulting slurry to bring its pH to between 9.5 and 10.0. The slurry was held at a temperature between 85° and 90° C. and held at a pH between 9.5 and 10.0 by adding an aqueous solution of sodium hydroxide, as necessary. To the slurry being stirred, 128 parts of an aqueous solution of sodium silicate having a concentration of 4.83 wt % as $SiO_2$ (the solution was referred to as Solution A) and 527 parts of a 1.2 wt % aqueous solution of tributyl phosphate (the solution was referred to as Solution B) were added simultaneously at rates of 0.9 part/min and 2.9 parts/min for Solutions A and B, respectively. Throughout the addition of the two solutions, the pH of the slurry was controlled between 9.5 and 10.0. The slurry was allowed to stand at a pH between 6.5 and 7.0, washed with water by decantation until no more sodium salt was detected, and filtered and dried to provide about 106 parts of a synthetic yellow iron oxide pigment having particles covered with fine, dense amorphous silica.

EXAMPLE 117

1,000 parts of a 0.4 wt % aqueous solution of sodium hydroxide were added to 100 parts of a synthetic yellow iron oxide pigment, and the mixture was subjected to a 2 hour hydrothermal treatment at 180° C. and 10 kg/cm². To the resulting slurry, 167 parts of an aqueous solution of zirconyl sulfate having a concentration of 0.3 wt % as $ZrO_2$ were added gradually at room temperature. After the addition, hydrolysis occurred in the slurry to form the fine deposit of zirconium hydroxide on the pigment particles. The slurry was then neutralized to a pH of 6.0, washed with water, the particles redispersed to obtain the initial slurry concentration, and the slurry was mixed with an aqueous solution of sodium silicate (JIS No. 3) to adjust the pH to a level between 9.5 and 10.0. The slurry temperature was held between 85° and 90° C., and the pH was controlled to rest between 9.5 and 10.0 by adding an aqueous solution of sodium hydroxide, if necessary. To the slurry being stirred, 128 parts of an aqueous solution of sodium silicate having a concentration of 4.83 wt % as $SiO_2$ (the solution was referred to as Solution A) and 249 parts of a 6.1 wt % aqueous solution of aluminum citrate (the solution was referred to as Solution B) were added simultaneously at rates of 0.9 part/min and 1.4 parts/min for Solutions A and B, respectively. Throughout the addition of the two solutions, the pH was held within the range of from 9.5 to 10.0. The procedure of Example 116 was repeated to provide about 106.5 parts of a synthetic yellow iron oxide composition having particles covered with zirconium-silica.

EXAMPLE 118

1,000 parts of a 2 wt % aqueous solution of sodium hydroxide were added to 100 parts of a synthetic yellow iron oxide pigment, and the mixture was subjected to a 2 hour hydrothermal treatment at 150° C. and 5 kg/cm². The slurry was washed with water, and 100 parts of an aqueous solution of aluminum sulfate having a concentration of 0.5 wt % as $Al_2O_3$ were added to the slurry at room temperature. After the addition, the slurry was neutralized to a pH of 6.0, washed with water, and a dispersing mill was used to redisperse the pigment particles to obtain the initial slurry concentration. The procedure of Example 116 was repeated to prepare a slurry having a temperature between 85° and 90° C. and a pH between 9.5 and 10.0. To the slurry being stirred, 128 parts of an aqueous solution of sodium silicate having a concentration of 4.83 wt % as $SiO_2$ (the solution was referred to as Solution A) and 173 parts of a 3.6 wt % aqueous solution of orthoboric acid (the solution was referred to as Solution B) were added simultaneously at rates of 0.9 part/min and 1.0 part/min for Solutions A and B, respectively. Throughout the addition of the two solutions, the pH of the slurry was held between 9.5 and 10.0. The procedure of Example 116 was repeated to provide about 106.5 parts of a synthetic yellow iron oxide composition having particles covered with aluminum-silica.

EXAMPLE 119

1,000 parts of a 2 wt % aqueous solution of sodium hydroxide were added to 100 parts of a synthetic yellow iron oxide pigment, and the mixture was subjected to a 5 hour hydrothermal treatment at 150° C. and 5 kg/cm². The slurry was washed with water, and 100 parts of an aqueous solution of titanium sulfate having a concentration of 1.0 wt % as $TiO_2$ were added to the slurry at room temperature. After the addition, the slurry was neutralized to a pH between 6.0 and 6.5. The procedure of Example 116 was repeated to prepare a uniform slurry having a temperature between 85° and 90° C. and a pH between 9.5 and 10.0. To the slurry being stirred, 128 parts of an aqueous solution of sodium silicate having a concentration of 4.83 wt % as $SiO_2$ (the solution was referred to as Solution A) and 133 parts of a 3.1 wt % aqueous solution of glyoxal (the solution was referred to as Solution B) were added simultaneously at rates of 0.9 part/min and 0.7 part/min for Solutions A and B, respectively. Throughout the addition of the two solutions, the pH of the slurry was held between 9.5 and 10.0. The procedure of Example 116 was repeated to provide about 107 parts of a synthetic yellow iron oxide composition having particles covered with titanium-silica.

EXAMPLE 120

1,000 parts of a 4 wt % aqueous solution of sodium hydroxide were added to 100 parts of a synthetic yellow iron oxide pigment, and the mixture was subjected to a 2 hour hydrothermal treatment at 150° C. and 5 kg/cm². The slurry was washed with water, and 100 parts of an aqueous solution of cerium chloride having a concentration of 0.5 wt % as $CeO_2$ were added to the slurry at room temperature. After the addition, the slurry was neutralized to a pH between 6.0 and 6.5. The procedure of Example 116 was repeated except that 128 parts of an aqueous solution of sodium silicate having a concentration of 4.83 wt % as $SiO_2$ (the solution was referred to as Solution A) and 216 parts of a 2.4 wt % aqueous solution of ethylene glycol diacetate (the solution was referred to as Solution B) were added simultaneously to the slurry at rates of 0.9 part/min (Solution A) and 1.2 parts/min (Solution B) under stirring. About 106.5 parts of a synthetic yellow iron oxide composition having particles covered with cerium-silica were provided.

EXAMPLE 121

1,000 parts of an 8 wt % aqueous solution of sodium hydroxide were added to 100 parts of a synthetic yellow iron oxide pigment, and the mixture was subjected to a 3 hour hydrothermal treatment at 95° C. and under atmospheric pressure. The slurry was washed with water, and 100 parts of an aqueous solution of antimony chloride having a concentration of 0.3 wt % as $Sb_2O_3$ were added to the slurry at room temperature. After the addition, the slurry was neutralized to a pH between 6.0 and 6.5 The procedure of Example 116 was repeated except that 128 parts of an aqueous solution of sodium silicate having a concentration of 4.83 wt % as $SiO_2$ (the solution was referred to as Solution A) and 150 parts of a 4.1 wt % aqueous solution of butyrolactone (the solution was referred to as Solution B) were added simultaneously to the slurry at rates of 0.9 part/min (Solution A) and 0.8 part/min (Solution B) while the slurry was stirred and controlled to have a pH between 9.5 and 10. About 106.3 parts of a synthetic yellow iron oxide composition having particles covered with antimony-silica were provided.

EXAMPLE 122

1,000 parts of an 8 wt % aqueous solution of sodium hydroxide were added to 100 parts of a synthetic yellow iron oxide pigment, and the mixture was subjected to a 5 hour hydrothermal treatment at 95° C. and under atmospheric pressure. The slurry was washed with water, and 100 parts of an aqueous solution of magnesium chloride having a concentration of 1.0 wt % as MgO were added to the slurry at room temperature. After the addition, the slurry was neutralized to a pH between 6.0 and 6.5. The procedure of Example 116 was repeated except that 128 parts of an aqueous solution of sodium silicate having a concentration of 4.83 wt % as $SiO_2$ (the solution was referred to as Solution A) and 191 parts of a 5.0 wt % aqueous solution of ammonium carbonate (the solution was referred to as Solution B) were added simultaneously to the slurry at rates of 0.9 part/min (Solution A) and 1.1 parts/min (Solution B) while the slurry was stirred and controlled for its pH. About 107 parts of a synthetic yellow iron oxide composition having particles covered with magnesium-silica was provided.

EXAMPLE 123

A slurry of chrome yellow (containing 200 parts of the pigment) was added to 330 parts of water containing 1 part of zirconyl sulfate ($ZrO.SO_4.nH_2O$) as $ZrO_2$, and an aqueous solution of sodium carbonate was added to the mixture to adjust its pH to 6.4. After washing with water by decantation, the slurry as filtered, and the cake was dried with a dryer 95°-100° C.) for a period of 12 hours to provide 201 parts of chrome yellow covered with zirconium. 100 parts of ground particles of the dried pigment were dispersed in 840 parts of water, and stirred at room temperature to form a uniform mixture. An aqueous solution of sodium silicate (JIS No. 3) was added to the slurry to bring its pH to between 9.0 and 10.0. The slurry was then passed through a homogenizer to make a uniform dispersion of the pigment particles which was held at a temperature between 85° and 90° C. and held at a pH between 9.0 and 10.0 by adding, as required, an aqueous solution of sodium hydroxide. To the slurry being stirred, 500 parts of an aqueous solution of sodium silicate (JIS No. 3) having a concentration of 4.83 wt % as $SiO_2$ (the solution was referred to as Solution A) and 476 parts of a 4.5 wt % aqueous solution of sodium hydrogenoxalate (the solution was referred to as Solution B) were added simultaneously at rates of 3.4 parts/min and 2.6 parts/min for Solutions A and B, respectively. Throughout the addition of the two solutions, the slurry was held at a pH between 9.0 and 10.0. A fine silica sol precipitated to form a uniform deposit on the pigment particles. The slurry was left to stand at a pH between 6.5 and 7.0, washed with water by decantation until no sodium salt was detected, and filtered and dried to provide about 120 parts of a chrome yellow composition having particles covered with zirconium-silica.

EXAMPLE 124

A slurry of chrome vermilion (containing 200 parts of the pigment) was added to 200 parts of an aqueous solution of cerium chloride having a concentration of 0.5 wt % as $CeO_2$. The procedure of Example 123 was repeated except that 500 parts of an aqueous solution of sodium silicate having a concentration of 4.83 wt % as $SiO_2$ (the solution was referred to as Solution A) and 583 parts of a 3.7 wt % aqueous solution of per-acetic acid (the solution was referred to as Solution B) were added simultaneously to the slurry rates of 3.4 parts/min (Solution A) and 3.2 parts/min (Solution B) at a controlled pH under stirring. About 120 parts of a chrome vermilion composition having particles covered with cerium-silica was provided.

EXAMPLE 125

A slurry of synthetic yellow iron oxide pigment (containing 200 parts of the pigment) was added to 200 parts of an aqueous solution of magnesium chloride having a concentration of 1.0 wt % as MgO. After the addition, an aqueous solution of sodium carbonate was added to the slurry to adjust its pH to between 6.0 and 6.5. The slurry was washed with water, filtered and dried to provide 202 parts of a magnesium-covered synthetic yellow iron oxide. 100 parts of ground particles of the dried pigment were dispersed in 480 parts of water containing 0.48 part of ferric chloride. The procedure of Example 123 was repeated except that 128 parts of an aqueous solution of sodium silicate having a concentration of 4.83 wt % as $SiO_2$ (the solution was referred to as Solution A) and 150 parts of a 4.2 wt % aqueous solution of ethyl acetate (the solution was referred to as Solution B) were added simultaneously to the slurry at rates of 0.9 part/min (Solution A) and 0.9 part/min (Solution B) under stirring. About 106 parts of a synthetic yellow iron oxide composition the particles of which were covered with magnesium-silica was provided.

EXAMPLE 126

A slurry of red oxide (containing 200 parts of the pigment) was added to 200 parts of an aqueous solution of aluminum sulfate having a concentration of 0.5 wt % as $Al_2O_3$. The procedure of Example 125 was repeated except that 128 parts of an aqueous solution of sodium silicate having a concentration of 4.83 wt % as $SiO_2$ (the solution was referred to as Solution A) and 196 parts of a 3.5 wt % aqueous solution of glutardialdehyde (the solution was referred to as Solution B) were added simultaneously to the slurry at rates of 0.9 part/min (Solution A) and 1.1 parts/min (Solution B) under stirring. About 106 parts of a red oxide composition having particles covered with aluminum-silica was provided.

EXAMPLE 127

A slurry of red lead (containing 200 parts of the pigment) was added to 200 parts of an aqueous solution of antimony chloride having a concentration of 0.3 wt % as $Sb_2O_3$. The procedure of Example 123 was repeated except that 210 parts of an aqueous solution of sodium silicate having a concentration of 4.83 wt % as $SiO_2$ (the solution was referred to as Solution A) and 251 parts of a 2.96 wt % aqueous solution of oxalic acid (the solution was referred to as Solution B) were added simultaneously to the slurry at rates of 1.4 parts/min (Solution A) and 1.4 parts/min (Solution B) under stirring. About 109 parts of a red lead composition having particles covered with antimony-silica was provided.

EXAMPLE 128

200 parts of well ground particles of antimony trioxide were dispersed in 2,000 parts of water and stirred at room temperature to form a uniform slurry. The slurry was then passed through a homogenizer to make a uniform dispersion of the pigment particles. 200 parts of an aqueous solution of titanium sulfate having a concentration of 1.0 wt % as $TiO_2$ were added to the slurry, and then an aqueous solution of sodium hydroxide was added to the slurry to bring its pH to about 6.0. The procedure of Example 123 was repeated except that 128 parts of an aqueous solution of sodium silicate having a concentration of 4.83 wt % as $SiO_2$ (the solution was referred to as Solution A) and 115 parts of a 3.0 wt % aqueous solution of triethyl borate (the solution was referred to as Solution B) were added simultaneously to the slurry at rates of 0.9 part/min (Solution A) and 0.6 part/min (Solution B) while the pH of the slurry was held between 9.0 and 10.0. About 106 parts of an antimony trioxide composition having particles covered with titanium-silica was provided.

EXAMPLES 129–145

100 parts of dried and ground particles of chrome yellow were treated by the procedure of Example 81 under the conditions specified in Table 9, and the chrome yellow composition having particles covered with fine amorphous silica was provided. Solution A was used in the manner and amount in Example 31.

TABLE 9

| | Pigment Slurry | | Solution B | | | |
|---|---|---|---|---|---|---|
| Ex. No. | pH | Temp. (°C.) | Compound | Cont. (wt %) | Amount Added (parts) | Rate of Addition (parts/min) |
| 129 | 9.0–10.0 | 85–90 | sodium hydrogencarbonate | 4.2 | 774 | 4.3 |
| 130 | " | 90–95 | acetic acid | 3.75 | 447 | 2.5 |
| 131 | " | " | ammonium chloride | 3.1 | 676 | 3.8 |
| 132 | " | " | zinc acetate | 5.0 | 1,020 | 5.7 |
| 133 | " | " | sodium hydrogensulfate | 2.7 | 1,727 | 9.6 |
| 134 | " | 85–90 | ammonium perchlorate | 7.0 | 652 | 3.6 |
| 135 | " | 90–95 | ammonium hydrogen phosphite | 3.3 | 1,160 | 6.4 |
| 136 | " | " | ammonium acetate | 3.5 | 612 | 3.4 |
| 137 | " | " | pyrophosphoric acid | 1.8 | 971 | 5.4 |
| 138 | " | " | mellitic acid | 2.4 | 675 | 3.7 |
| 139 | " | 85–90 | ammonium amidosulfate | 2.9 | 772 | 4.3 |
| 140 | " | 90–95 | o-cresol | 1.3 | 2,311 | 12.8 |

TABLE 9-continued

| | Pigment Slurry | | | Solution B | | |
|---|---|---|---|---|---|---|
| Ex. No. | pH | Temp. (°C.) | Compound | Cont. (wt %) | Amount Added (parts) | Rate of Addition (parts/min) |
| 141 | " | " | ammonium carbonate | 5.0 | 748 | 4.2 |
| 142 | " | " | glycine | 5.0 | 417 | 2.3 |
| 143 | " | " | sodium hydrogensulfite | 2.9 | 1,388 | 7.7 |
| 144 | " | " | 2-pyridine carboxylic acid | 4.4 | 781 | 4.3 |
| 145 | " | " | sodium dihydrogen phosphate monohydrate | 7.4 | 728 | 4.0 |

EXAMPLE 146

The procedure of Example 81 was repeated to prepare a slurry of 100 parts of chrome yellow, and a 4.83 wt % aqueous solution of sodium silicate (Solution A) and 3.5 wt % aqueous solution of acetic acid (Solution B) were added simultaneously to the slurry in the amounts and at the rates of addition specified in Table 10 below. Chrome yellow compositions having particles covered with different proportions of fine amorphous silica were provided as shown in Table 10.

TABLE 10

| | Solution A | | Solution B | | |
|---|---|---|---|---|---|
| Run No. | Amount (parts) | Rate of Addition (parts/min) | Amount (parts) | Rate of Addition (parts/min) | SiO$_2$ (wt %) |
| 1 | 82.8 | 2.1 | 78.8 | 1.7 | 3.9 |
| 2 | 290.4 | 3.0 | 276.4 | 2.5 | 12.3 |
| 3 | 668.2 | 3.7 | 636.1 | 3.0 | 24.4 |
| 4 | 1,269.0 | 4.3 | 1,208.0 | 3.8 | 38.0 |

EXAMPLE 147

The procedure of Example 83 was repeated to prepare a slurry of 100 parts of a synthetic yellow iron oxide pigment, and a 4.83 wt % aqueous solution of sodium silicate (Solution A) and a 3.1 wt % aqueous solution of ammonium chloride (Solution B) were added simultaneously to the slurry in the amounts and at the rates of addition specified in Table 11 below. Synthetic yellow iron oxide pigment compositions having particles covered with different proportions of fine amorphous silica were provided as shown in Table 11.

TABLE 11

| | Solution A | | Solution B | | |
|---|---|---|---|---|---|
| Run No. | Amount (parts) | Rate of Addition (parts/min) | Amount (parts) | Rate of Addition (parts/min) | SiO$_2$ (wt %) |
| 1 | 82.8 | 2.1 | 111.9 | 2.2 | 3.9 |
| 2 | 207.0 | 2.3 | 279.8 | 2.5 | 9.2 |
| 3 | 518.0 | 2.9 | 700.1 | 3.4 | 20.2 |
| 4 | 828.0 | 3.4 | 1119.1 | 3.8 | 28.8 |

Tests and their results

1. Acid Resistance Test (A):

A painted plate was immersed in 5 wt % H$_2$SO$_4$ at 50° 1 C. for 8 hours, and the resulting change was checked.

2. Acid Resistance Test (B):

A pigment powder was immersed in 1 wt % H$_2$SO$_4$ at 50° 1 C. for 8 hours, filtered, washed with water and dried, and the resulting weight loss and change in the color of the recovered pigment were checked.

3. Alkali Resistance Test:

A pigment powder was immersed in 1 wt % aqueous solution of potassium hydroxide at room temperature for 12 hours, filtered, washed with water and dried, and the resulting weight loss and change in the color of the recovered pigment were checked.

4. Hydrogen Sulfide Resistance Test:

A test piece was immersed in saturated hydrogen sulfide water at room temperature for 1 hour, and the resulting change in hue was checked.

5. Heat Resistance Test:

A mixture of 100 parts of polyethylene powder from medium-low pressure polymerization process and 0.5 part of a sample pigment was held at different temperature between 200° and 260° C. for 5 minutes during which it was injection-molded to form panels, and the resulting change was checked.

6. Light Resistance Test:

A sample was exposed to a fadeometer for 500 hours, and the resulting change was checked.

7. Weatherability Test:

A sample was exposed to a weatherometer for 1,000 hours, and any chalking and change in color were checked.

8. Dispersability Test:

A pigment formulated as a paint was applied by an applicator to a glass plate in a thickness of 3 mils, baked at 150° C. for 30 minutes, and the surface of the film was observed.

9. Thickening Test:

A pigment formulated as a paint was placed in an air-tight container and left to stand at 50° C. for a given period of time. The resulting increase in the viscosity was checked by a viscosimeter.

(I) The paints and painted plates tested in Runs No. 1, 6, 7, 8 and 9 were prepared by the following method:

80 parts of a melamine alkyd resin were mixed with 20 parts of the test pigment, 20 parts of xylol and 200 parts of beads, and the mixture was stirred in a paint shaker for 30 minutes to form a uniform dispersion. The dispersion was filtered to separate the beads. The filtrate was applied to a specified steel sheet by an applicator, left to stand for 30 minutes, and baked at 150° C. for 30 minutes to thereby obtain a test piece.

(II) Preparation of the test pieces used in Run No. 4.

A 50 g sample of a mixture of 100 parts of PVC (soft), 50 parts of DOP, 0.5 part of barium stearate, and 0.5 parts of calcium stearate was mixed with 0.5 g of a sample pigment and milled with a heated roll at 160° C. for 3 minutes until a sheet was provided. The sheet was cut into test pieces of a suitable size.

Test Results

The pigments prepared in the Examples 81–147 were very stable and resistant to the hostile testing conditions. On the other hand, the controls deteriorated to a great extent. The effect of this invention was particularly conspicuous with chromate pigments, iron oxide pigments, lead oxide pigments.

While the invention has been described in detail and with reference to specific embodiments thereof, it will be apparent to one skilled in the art that various changes and modifications can be made therein without departing from the spirit and scope thereof.

What is claimed is:

1. A process for preparing a stable inorganic pigment which comprises adding an aqueous solution of sodium silicate having a concentration of sodium silicate of from 1 to 10 wt % as $SiO_2$ and an aqueous solution of one or more compounds simultaneously to an aqueous slurry of pigment having a pigment concentration of about 50 to 300 g/l to react the two solutions and thereby form and deposit a continuous non-porous coating of amorphous silica on the surface of said pigment, wherein said reaction is carried out at a temperature of at least about 60° C. to 100° C. for 1 to 6 hours such that the pH of the slurry is controlled constant at a predetermined pH within the range of from 7 to 11, said compounds having a solubility of at least about 0.01 g/100 g water at 20° C., providing a pH of at least about 1.0 in a 3.0 wt % aqueous solution and being selected from the group consisting of aliphatic carboxylic acids, oxycarboxylic acids, an ester or aldehyde of said above acids, a sodium salt of hydrogen sulfate or hydrogen carbonate, and ammonium salt of a halogen acid or a sulfurous oxyacid and ethylene carbonate, wherein said pigment is selected from the group consisting of ultramarine and bronze powder.

2. The process of claim 1, wherein said ammonium salt is ammonium chloride, ammonium sulfate, ammonium hydrogen sulfate, ammonium sulfite or ammonium hydrogen sulfite.

3. The process of claim 1, wherein said pH of the slurry does not vary more than ±0.5 from said predetermined pH.

4. The process of claim 1, wherein said predetermined pH is within the range of 8 to 11.

5. The process of claim 1, wherein said reaction is completed within 1 to 4 hours.

6. The process of claim 1, wherein the compound which reacts with the sodium silicate solution to form a silica sol is selected from the group consisting of ethylene glycol diacetate, ethylene glycol monoacetate, methyl acrylate, glutardialdehyde, acetic acid and tartaric acid.

* * * * *